(12) United States Patent
Kanai et al.

(10) Patent No.: US 9,353,270 B2
(45) Date of Patent: May 31, 2016

(54) SURFACE-TREATED METAL AND METHOD FOR PRODUCING SAME

(75) Inventors: Takao Kanai, Tokyo (JP); Yuji Kubo, Tokyo (JP); Yoshio Kimata, Tokyo (JP); Hiroshi Kanai, Tokyo (JP); Tomonari Hamamura, Tokyo (JP); Hiromasa Nomura, Kimitsu (JP)

(73) Assignees: NIPPON STEEL & SUMITOMO METAL CORPORATION, Tokyo (JP); NIPPON STEEL & SUMIKIN COATED SHEET CORPORATION, Tokyo (JP)

( * ) Notice: Subject to any disclaimer, the term of this patent is extended or adjusted under 35 U.S.C. 154(b) by 0 days.

(21) Appl. No.: 14/126,489

(22) PCT Filed: Jun. 18, 2012

(86) PCT No.: PCT/JP2012/065546
§ 371 (c)(1),
(2), (4) Date: Dec. 16, 2013

(87) PCT Pub. No.: WO2012/173277
PCT Pub. Date: Dec. 20, 2012

(65) Prior Publication Data
US 2014/0120320 A1 May 1, 2014

(30) Foreign Application Priority Data

Jun. 17, 2011 (JP) ................................. 2011-135378
Nov. 17, 2011 (JP) ................................. 2011-251698

(51) Int. Cl.
*B32B 3/00* (2006.01)
*C09D 5/16* (2006.01)
(Continued)

(52) U.S. Cl.
CPC ............. *C09D 5/1618* (2013.01); *B01J 21/063* (2013.01); *B01J 23/06* (2013.01); *B01J 23/20* (2013.01);
(Continued)

(58) Field of Classification Search
CPC ............... Y10T 428/24612; Y10T 428/24893; B32B 15/08
USPC ........................................................ 428/195.1
See application file for complete search history.

(56) References Cited

U.S. PATENT DOCUMENTS

2008/0286454 A1* 11/2008 Yamamoto ........... B41J 2/04506
427/162
2009/0192252 A1* 7/2009 Stration ............... C09D 5/1687
524/425
2010/0009085 A1* 1/2010 Goodwin ............... B01J 35/004
427/372.2

FOREIGN PATENT DOCUMENTS

CN 1575972 2/2005
CN 1575973 2/2005
(Continued)

OTHER PUBLICATIONS

JP06-088248; english machine translation; Mar. 29, 1994; Sakai et al. "Pattern Steel Plate".*
(Continued)

*Primary Examiner* — Aaron Austin
*Assistant Examiner* — Laura Figg
(74) *Attorney, Agent, or Firm* — Kenyon & Kenyon LLP

(57) ABSTRACT

This surface-treated metal includes a metal, and a coated material on a surface of the metal, in which an outermost layer is a photocatalytic film that contains particles showing photocatalytic activity and an organic-inorganic composite resin, a volume ratio of the particles to the film is in a range from 0.5 to 50 vol %, the resin contains a siloxane bond and at least one group selected from the group consisting of an aryl group, a carboxyl group, an amino group, a hydroxyl group, and an alkyl group having 1 to 12 carbon atoms, the coated material has concaves on a surface thereof on the outermost layer side, an area of the outermost layer is 50% to 98% of an area of a surface of the metal, and a surface area of the outermost layer is 101% to 5000% of the area of the surface of the metal.

9 Claims, 3 Drawing Sheets

(51) Int. Cl.
    *B01J 37/02* (2006.01)
    *B01J 21/06* (2006.01)
    *B01J 23/20* (2006.01)
    *B01J 35/00* (2006.01)
    *C09D 7/12* (2006.01)
    *C09D 183/14* (2006.01)
    *B01J 23/06* (2006.01)
    *B01J 37/03* (2006.01)
    *C08G 77/58* (2006.01)
    *C08G 77/14* (2006.01)
    *C08G 77/26* (2006.01)
    *C08G 77/00* (2006.01)
    *C08K 3/22* (2006.01)
    *B01J 35/02* (2006.01)

(52) U.S. Cl.
    CPC .......... *B01J 35/004* (2013.01); *B01J 37/0219* (2013.01); *B01J 37/0225* (2013.01); *C09D 5/1675* (2013.01); *C09D 7/1291* (2013.01); *C09D 183/14* (2013.01); *B01J 35/023* (2013.01); *B01J 37/0244* (2013.01); *B01J 37/033* (2013.01); *B01J 2523/00* (2013.01); *C08G 77/14* (2013.01); *C08G 77/26* (2013.01); *C08G 77/58* (2013.01); *C08G 77/80* (2013.01); *C08K 2003/2237* (2013.01); *Y10T 428/24612* (2015.01); *Y10T 428/24893* (2015.01)

(56) References Cited

FOREIGN PATENT DOCUMENTS

| | | | | |
|---|---|---|---|---|
| CN | 101218376 | | 7/2008 | |
| JP | 06-088248 | * | 3/1994 | ............ C23C 22/00 |
| JP | 06088248 A | * | 3/1994 | ............ C23C 22/00 |
| JP | 07-113272 | | 5/1995 | |
| JP | 07-171408 | | 7/1995 | |
| JP | 08-164334 | | 6/1996 | |
| JP | 10-225658 | | 8/1998 | |
| JP | 2000-063733 | | 2/2000 | |
| JP | 2000-317393 | | 11/2000 | |
| JP | 2004-307957 | * | 11/2004 | ............ C23C 26/00 |
| JP | 2004-330550 | * | 11/2004 | ............ B32B 15/08 |
| JP | 2004307957 A | * | 11/2004 | ............ C23C 26/00 |
| JP | 2006-192716 | | 7/2006 | |
| JP | 2011-084074 | | 4/2011 | |
| JP | 2011-511126 | | 4/2011 | |
| TW | 201104016 | | 2/2011 | |
| WO | 2009/097004 | | 8/2009 | |

OTHER PUBLICATIONS

JP 2004-307957; english machine translation; Nov. 4, 2004; Nakamura et al. "Inorganic/Organic Bilayer Painted Metal Plate".*

JP2004-330550; english machine translation; Nov. 25, 2004; Koura et al. "Photocatalyst-coated metal plate excellent in contamination resistance and paint film adhesion property and its production method".*

International Search Report dated Aug. 28, 2012 issued in corresponding PCT Application No. PCT/JP2012/065546 [With English Translation].

Office Action dated May 21, 2014 issued in CN Application No. 201280029690.2 [with English Translation].

\* cited by examiner

SURFACE-TREATED METAL AND METHOD FOR PRODUCING SAME

TECHNICAL FIELD

The present invention relates to a surface-treated metal which includes a film (hereinafter, referred as "photocatalytic film") showing photocatalytic activity on a surface thereof and has superior contamination resistance, and to a method of producing the same. In particular, the present invention relates to a surface-treated metal in which a photocatalytic film contains a matrix resin having a little amount of deterioration caused by a photocatalyst and has concave so as to exhibit superior contamination resistance due to high photocatalytic activity for a long period of time from the initial stage immediately after usage starts, and to a method of producing the same.

This application is a national stage application of International Application No. PCT/JP2012/065546, filed Jun. 18, 2012, which claims priority to Japanese Patent Application No. 2011-135378, filed on Jun. 17, 2011 and Japanese Patent Application No. 2011-251698, filed on Nov. 17, 2011, the contents of which are incorporated herein by reference.

BACKGROUND ART

There are many cases in which a metal (for example, steel) is coated and used for improving durability or for obtaining a beautiful external appearance, and a coated metal is widely used in various fields such as home electronics, automobiles, building materials, and outdoor structures. It is necessary that the metal has superior contamination resistance in addition to corrosion resistance, because the metal is exposed to rain, wind, dust, and the like, particularly when being used in outdoors.

Photocatalytic technique is a technique of dispersing particles having superior photocatalytic activity in a coating film of a material surface in order to decompose and remove contaminants mainly composed of organic materials. In this technique, the particles having superior photocatalytic activity have a high effect on the decomposition of contaminants of the surface. But also this technique deteriorates a coating film by gradually decomposing the resin-based coating film which is an organic material. Therefore, it is difficult to use the coating film for a long period of time without any change. Accordingly, in order to minimize deterioration of the coating film, various proposals have been made.

For example, a method of using an inorganic material as a matrix is disclosed in Patent Documents 1 and 2. In addition, since a fluororesin among organic materials for coating films is relatively stable to a photocatalyst, a method of using a fluororesin as a matrix is disclosed (Patent Document 3). In addition, in order to obtain high stability to a photocatalyst and workability which are required particularly for a pre-coated metal, a technique of using a silica-organosilane material as a matrix is disclosed in Patent Documents 4 and 5 as a method of using an acrylic silicate, which is obtained by a polymerization reaction of an acrylic resin and an organoalkoxysilane, as a matrix. In addition, a method using a vinylidene fluoride resin and an acrylic resin is disclosed in Patent Document 6.

Meanwhile, since particles (hereinafter, referred as "photocatalytic particles") having photocatalytic activity are almost uniformly dispersed in a film, the concentration of the photocatalytic particles in a surface of the film is not necessarily high. In addition, while the photocatalytic particles are dispersed in the film, surfaces of the particles are covered with a matrix resin. Therefore, even when the photocatalytic particles are present near the surface of the film, contaminants on the surface may not be decomposed immediately after usage starts.

In addition, regarding the photocatalytic film, while the film is used for a certain period under sunlight or ultraviolet light, a resin near a surface of the film is slightly decomposed and impaired by a photocatalytic effect and thus, surfaces of photocatalytic particles are exposed to the outside, thereby superior contamination resistance is exhibited. However, as described above, when a stable resin to a photocatalyst is used as a matrix resin, it is difficult to advance the decomposition and deterioration of the resin. Therefore, a long period of time is required in order to exhibit superior contamination resistance. Accordingly, in a coated metal, it is difficult to exhibit superior contamination resistance from the initial stage immediately after usage starts, and to suppress the decomposition and deterioration of a matrix resin of a film and thus maintain superior contamination resistance for a long period of time.

CITATION LIST

Patent Document

[Patent Document 1] Japanese Unexamined Patent Application, First Publication No. H07-113272
[Patent Document 2] Japanese Unexamined Patent Application, First Publication No. H08-164334
[Patent Document 3] Japanese Unexamined Patent Application, First Publication No. H07-171408
[Patent Document 4] Japanese Unexamined Patent Application, First Publication No. H10-225658
[Patent Document 5] Japanese Unexamined Patent Application, First Publication No. 2000-317393
[Patent Document 6] Japanese Unexamined Patent Application, First Publication No. 2000-63733

SUMMARY OF THE INVENTION

Problem to be Solved by the Invention

An object of the invention is to provide a surface-treated metal capable of solving the above-described problems of the related art.

Another object of the invention is to provide a surface-treated metal in which superior contamination resistance can be exhibited by exhibiting a sufficient photocatalytic effect from the initial stage immediately after usage starts.

Still another object of the invention is to provide a surface-treated metal in which there is almost no deterioration of a matrix resin and an organic resin coating film. The matrix resin constitutes a part of a photocatalytic film, and the organic resin coating film is an undercoat of the photocatalytic film.

Means for Solving the Problems

In order to solve the above-described problems, as a result of thorough investigation, the present inventors found that the above-described problems could be solved by using a stable resin to a photocatalyst as a matrix resin and introducing concave into a photocatalytic film.

The invention may include, for example, the following aspects.

(1) A surface-treated metal according to an aspect of the invention includes: a metal, and a coated material that is formed on a surface of the metal, in which an outermost layer of the coated material is a photocatalytic film that contains particles showing a photocatalytic activity and an organic-inorganic composite resin, a volume ratio of the particles showing photocatalytic activity to the photocatalytic film is in a range from 0.5 vol % to 50 vol %, the organic-inorganic composite resin contains a siloxane bond and at least one group selected from the group consisting of an aryl group, a carboxyl group, an amino group, a hydroxyl group, and an alkyl group having 1 to 12 carbon atoms, the coated material has a concave on a surface on the outermost layer side thereof, the concave extends in a direction perpendicular to a thickness direction of the outermost layer, the concave separates the outermost layer in the direction perpendicular to the thickness direction when the outermost layer is seen in a cross-sectional view taken along the thickness direction, an area of the outermost layer is 50% to 98% of an area of the surface of the metal when the coated material is seen in a plan view, and a surface area of the outermost layer is 101% to 5000% of the area of the surface of the metal.

(2) In the surface-treated metal according to (1), when dimensions of the concaves in a direction perpendicular to both a direction in which the concave extends and the thickness direction are represented by widths W and dimensions of the concave in the direction in which the concave extends are represented by lengths L, a total of the lengths L of the concave of portions in which the widths W is in a range from 1% to 1000% of a thickness of the outermost layer may be 90% to 100% of a total of the lengths L of the concave.

(3) In the surface-treated metal according to (1) or (2), when the coated material is seen in a plan view, a plurality of the concaves may be present, the concaves may form a network shape, and sizes of the outermost layer portions which are surrounded by the concaves may be different from each other.

(4) In the surface-treated metal according to any one of (1) to (3), when the outermost layer is seen in a cross-sectional view taken along the thickness direction, a surface opposite the metal among two surfaces facing each other in the thickness direction of the outermost layer may have a plurality of flat areas, and a total length of the plurality of flat areas may be 70% to 99% of a total length of the surface.

(5) In the surface-treated metal according to any one of (1) to (4), the particles showing photocatalytic activity may contain a titanium oxide having an anatase-type structure.

(6) In the surface-treated metal according to any one of (1) to (5), the metal may be any one selected from the group consisting of a steel sheet, a stainless steel sheet, a titanium sheet, a titanium alloy sheet, an aluminum sheet, an aluminum alloy sheet, and a plated metal sheet having a plated layer.

(7) In the surface-treated metal according to any one of (1) to (6), the coated material may have a second layer in contact with the outermost layer between the outermost layer and the metal.

(8) In the surface-treated metal according to (7), a ratio of a micro-Vickers hardness of the second layer to a micro-Vickers hardness of the outermost layer may be 0.20 to 0.95.

(9) In the surface-treated metal according to (7) or (8), a water contact angle of the second layer may be in a range obtained by adding 10° to 80° to a water contact angle of the outermost layer.

(10) In the surface-treated metal according to any one of (1) to (9), a ratio of the particles showing photocatalytic activity to the photocatalytic film may be in a range from 0.5 mass % to 50 mass %, a particle size distribution based on the number of the particles showing photocatalytic activity may have a plurality of maximum values and minimum values which are present between adjacent maximum values in the plurality of maximum values, and two or more maximum values in the plurality of maximum values may have a number frequency which is 1.5 times or greater of a number frequencies of minimum values adjacent to the maximum values thereof.

(11) In the surface-treated metal according to (10), the particle size distribution may have at least one of the two or more maximum values of a particle size range of 100 nm or less and may have at least one of the two or more maximum values of a particle size range of 500 nm or greater.

(12) According to another aspect of the invention, there is provided a method of producing a surface-treated metal by forming a coated material on a surface of a substrate containing a metal, the method including: mixing particles showing a photocatalytic activity with a liquid which contains a hydrolysate of an alkoxysilane having at least one group selected from a group consisting of an aryl group, a carboxyl group, an amino group, a hydroxyl group, and an alkyl group having 1 to 12 carbon atoms such that a ratio of the particles showing the photocatalytic activity to the liquid is in a range from 1 g/l to 50 g/l to prepare a first treatment liquid, coating the first treatment liquid such that the first treatment liquid covers an outermost layer of the coated material, and baking the first treatment liquid.

(13) In the method of producing the surface-treated metal according to (12), the liquid or the first treatment liquid may further contain a hydrolysate of at least one tetraalkoxysilane selected from a group consisting of a tetramethoxysilane and a tetraethoxysilane.

(14) In the method of producing the surface-treated metal according to (12) or (13), a non-volatile content in the first treatment liquid may be 2.5 mass % to 10 mass %.

(15) The method of producing the surface-treated metal according to any one of (12) to (14) may further include cooling the outermost layer, after baking the first treatment liquid, such that an average cooling rate in a temperature range from 250° C. to 100° C. is 100° C./sec to 1500° C./sec.

(16) In the method of producing the surface-treated metal according to any one of (12) to (15), the first treatment liquid may be coated using a dip coating method, a spray coating method, a bar coating method, a roll coating method, a spin coating method, or a curtain coating method.

(17) In the method of producing the surface-treated metal according to any one of (12) to (16), various types of treatment liquids may be coated to form the coated material having a plurality of layers, and the various types of treatment liquids may include the first treatment liquid and a second treatment liquid which is a different type from the first treatment liquid.

(18) In the method of producing the surface-treated metal according to (17), a ratio of a micro-Vickers hardness when the second treatment liquid is cured to a micro-Vickers hardness when the first treatment liquid is cured may be 0.20 to 0.95.

(19) In the method of producing the surface-treated metal according to (17) or (18), a water contact angle when the second treatment liquid is cured may be in a range obtained by adding 10° to 80° to a water contact angle when the first treatment liquid is cured.

(20) In the method of producing the surface-treated metal according to any one of (17) to (19), a lower layer film containing an organic resin may be formed on the surface of the substrate, the second treatment liquid and the first treatment liquid may be simultaneously coated on the lower layer film, and the second treatment liquid and the first treatment liquid may be simultaneously dried and baked to form a multi-layer film including the lower layer film formed on the surface of the substrate, a second layer film formed by curing the second treatment liquid on the lower layer film, and an outermost layer film formed by curing the first treatment liquid on the second layer film.

(21) In the method of producing the surface-treated metal according to any one of (17) to (20), a coating liquid used to form a lower layer film containing an organic resin, the second treatment liquid, and the first treatment liquid may be simultaneously coated on the surface of the substrate, and the coating liquid, the second treatment liquid, and the first treatment liquid may be simultaneously dried and baked to form a multi-layer film including the lower layer film formed on the surface of the substrate, a second layer film formed by curing the second treatment liquid on the lower layer film, and an outermost layer film formed by curing the first treatment liquid on the second layer film.

(22) In the method of producing the surface-treated metal according to any one of (12) to (21), the particles showing photocatalytic activity may contain a titanium oxide having an anatase-type structure.

(23) In the method of producing the surface-treated metal according to any one of (12) to (22), the substrate containing the metal may be any one selected from the group consisting of a steel sheet, a stainless steel sheet, a titanium sheet, a titanium alloy sheet, an aluminum sheet, an aluminum alloy sheet, a plated metal sheet having a plated layer, and a pre-painted steel sheet.

(24) In the method of producing the surface-treated metal according to any one of (12) to (23), a particle size distribution based on a number of the particles showing photocatalytic activity may have a plurality of maximum values and minimum values which are present between adjacent maximum values in the plurality of maximum values, and two or more maximum values in the plurality of maximum values may have a number frequency which is 1.5 times or greater of number frequencies of minimum values adjacent to the maximum values thereof.

(25) In the method of producing the surface-treated metal according to (24), the particle size distribution may have at least one of the two or more maximum values of a particle size range of 100 nm or less and may have at least one of the two or more maximum values of a particle size range of 500 nm or greater.

Effects of the Invention

According to the above-described aspects of the invention, it is possible to provide a surface-treated metal which is capable of exhibiting superior contamination resistance due to high photocatalytic activity for a long period of time from the initial stage immediately after usage starts. Therefore, without washing the surface-treated metal, the user of a product or a structure can maintain an external appearance of the product or the structure in the clean and the favorable state until a product lifetime or a service life after usage starts.

According to the above-described aspects of the invention, it is possible to easily obtain a surface-treated metal which has superior contamination resistance due to a photocatalytic effect from the initial stage immediately after usage starts and in which there is almost no deterioration of a matrix resin and an organic resin coating film. The matrix resin constitutes a part of a photocatalytic film, and the organic resin coating film is an undercoat of the photocatalytic film.

In addition, according to the above-described aspect of the method of producing a surface-treated metal of the invention, a photocatalytic film which is usually formed by using a post-coating method in the related art can be easily obtained by using a pre-coating method. That is, according to the above-described aspect of the invention, a surface-treated metal which has superior weather resistance and contamination resistance for a long period of time can be easily obtained, and processes such as bending and drawing can be performed thereto. Therefore, the surface-treated metal can be more flexibly applied to various products or structures.

DESCRIPTION OF EMBODIMENTS

Figure 1A:
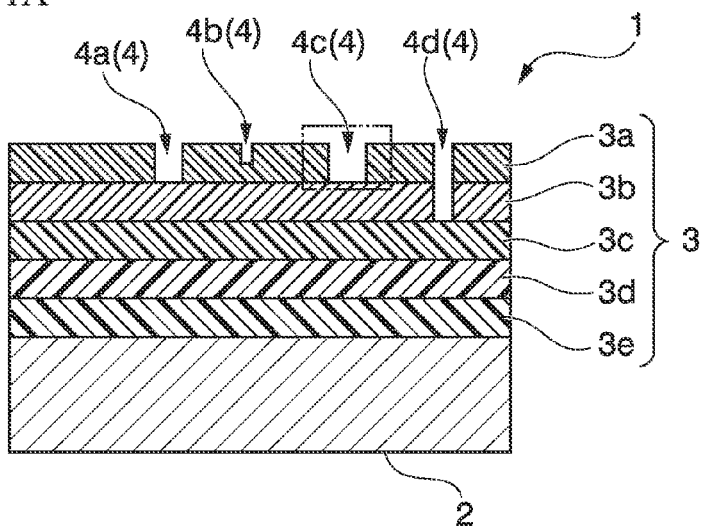
FIG. 1A is a vertical cross-sectional view schematically illustrating a part of an example of a surface-treated metal according to an embodiment of the invention.

Objects of the invention are as follows.

First, by using a resin which is difficult to decompose and deteriorate with respect to a photocatalyst as a matrix resin of a photocatalytic film, the decomposition and deterioration of the resin by the photocatalyst is suppressed, and superior contamination resistance is maintained for a long period of time. As the matrix resin of the photocatalytic film of the outermost layer, an organic-inorganic composite resin which has been investigated by the present inventors is mainly used. Thus, the matrix resin has high resistance to deterioration to a photocatalyst. Therefore, a contamination resistance effect can be obtained by a photocatalyst such that the surface-treated metal can maintain its external appearance in the favorable state for a long period of time.

Second, by existing concave (for example, cracks) on the above-described photocatalytic film, a surface area of the film is increased. Therefore a photocatalytic reaction can be effectively induced. In addition, contamination resistance caused by the decomposition of contaminants is an effect obtained by photocatalytic particles which are present on a film surface. By existing the concave, even photocatalytic particles which are present inside the film can contribute to contamination resistance. Furthermore, as described below in detail, in a step of forming a film, particularly in the case of concave which are physically introduced during heating, cooling, or the like, photocatalytic particles which are not covered with a resin may be exposed through side surfaces of the concave. Therefore, the photocatalytic particles can exhibit contamination resistance due to a photocatalytic effect from the initial stage which is in contact with contaminants. That is, by introducing concave into a photocatalytic film, the photocatalytic film can exhibit a high level of contamination resistance from the initial stage immediately after usage starts.

Regarding this point, in a general surface-treated steel sheet (of the related art), by introducing concave (for example, cracks) into a coating layer of a surface, there are many cases in which the adhesion of the coating layer may deteriorate or in which the corrosion resistance of the steel sheet may deteriorate. In addition, since there may be a problem that the design of an external appearance deteriorates, the introduction of concave into a coating layer of a surface side of the surface-treated steel sheet is a method which is not usually adopted. However, the present inventors have found that a significantly high level of contamination resistance can be exhibited by using the above-described two methods from the initial stage immediately after usage starts. In addition, by regulating the properties and amount of concave which are introduced into a photocatalytic film, it is confirmed that the adhesion of a coating layer such as a photocatalytic film and the external appearance of a steel sheet do not deteriorate.

According to the above-described facts, advantageous effects can be applied to a surface-treated metal, in that a high level of contamination resistance can be exhibited from the initial stage immediately after usage starts, and in that this effect (contamination resistance) can be maintained for a long period of time.

Hereinbelow, a surface-treated metal according to an embodiment of the invention will be described in detail.

Figure 2:
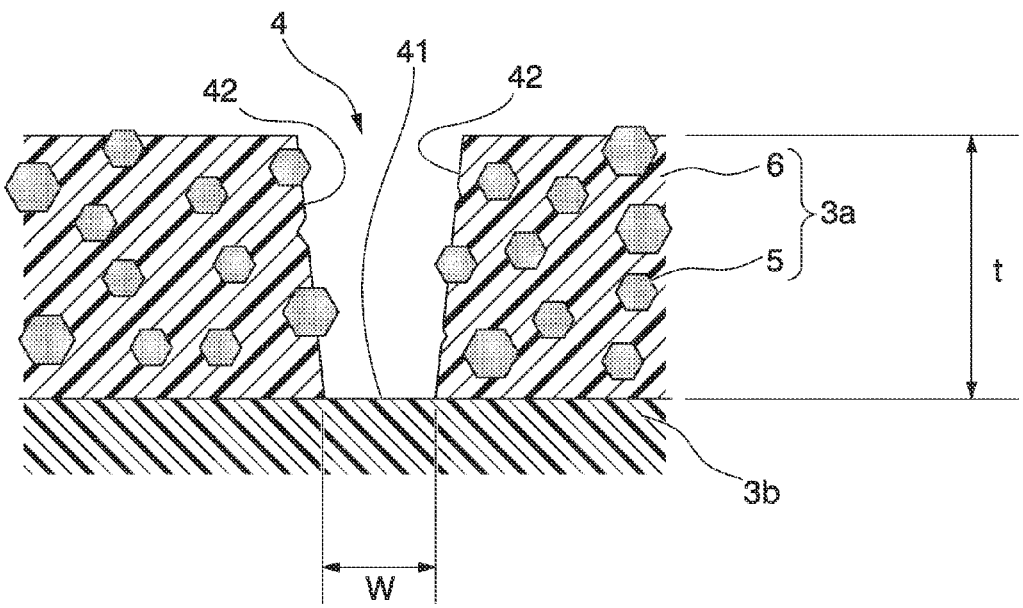
FIG. 2 is an enlarged diagram schematically illustrating a part of FIG. 1A indicated by a two-dot chain line.

FIG. 1A is a vertical cross-sectional view schematically illustrating a part of an example of a surface-treated metal according to the embodiment, and FIG. 2 is an enlarged diagram schematically illustrating a part of FIG. 1A indicated by a two-dot chain line.

As illustrated in FIG. 1A, a surface-treated metal 1 according to the embodiment includes a metal 2 and a coated material 3 that is formed on a surface of the metal 2. The coated material 3 includes at least one of coating layers 3a to 3e. As illustrated in FIG. 2, the outermost layer 3a of the coated material 3 is the photocatalytic film 3a including particles which are showing photocatalytic activity or aggregates thereof 5 (hereinafter, also abbreviated as "photocatalytic dispersed phase 5") and an organic-inorganic composite resin 6 (hereinafter, also abbreviated as "matrix resin 6").

Furthermore, in this specification and the drawings, components having substantially the same function and composition are represented by the same reference numerals and a description thereof will not be repeated here.

(Presence of Concave)

The surface-treated metal 1 according to the embodiment includes concave 4 (for example, cracks) on a surface of the outermost layer 3a side of the coated material 3 (a side (an environmental side) on which the photocatalytic film 3a is in contact with gas (for example, the air) or liquid (for example, water)) when seen from the metal 2 side. With these concaves 4, coverage of the photocatalytic film 3a per unit area of the metal 2 which is a substrate is controlled to be in a range from 98% to 50%. The above fact has the following meaning. When the outermost layer 3a is seen in a cross-sectional view (refer to FIGS. 1A and 2) taken along a thickness direction thereof, a part of the concaves 4 separate the outermost layer 3a in a direction perpendicular to the thickness direction of the outermost layer 3a. Therefore, when the coated material 3 is seen in a plan view (refer to FIG. 3 described below), an area of the outermost layer 3a is 50% to 98% of an area of a surface of the metal 2. That is, bottoms 41 of a part of the concaves 4 reach the surface of the metal 2 which is the substrate (for example, refer to a concave 4i of FIG. 1B described below and concaves 4k and 4m of FIG. 1C described below). Alternatively, when other coating layers 3b to 3c are present below the outermost layer 3a (between the outermost layer 3a and the metal 2), the bottoms 41 of a part of the concaves 4 reach surfaces or insides of the coating layers 3b to 3e (for example, refer to concaves 4a. 4c, and 4d of FIG. 1A and concaves 4f, 4g, and 4h of FIG. 1B described below). In addition when the other coating layers 3b to 3e are present below the outermost layer 3a, it is not necessary for the concaves 4 to penetrate the other coating layers 3b to 3e so as to expose the surface of the metal 2 which is the substrate.

Due to the presence of the concaves 4 which is penetrated, the photocatalytic film (outermost layer) 3a according to the embodiment has coverage in a range from 98% to 50%. When the coverage of the photocatalytic film 3a is excessively large, it is difficult to sufficiently obtain the effect of the introduction of the concaves 4 into the coated material 3. Conversely, when the coverage of the photocatalytic film 3a is excessively small, sufficient contamination resistance cannot be obtained. Regarding the coverage of the photocatalytic film 3a due to the presence of the concaves 4, the lower limit thereof is preferably greater than or equal to 55% or 60% and more preferably greater than or equal to 70%, and the upper limit thereof is preferably less than or equal to 95%, more preferably less than or equal to 90%, and still more preferably less than or equal to 85%.

Figure 3:
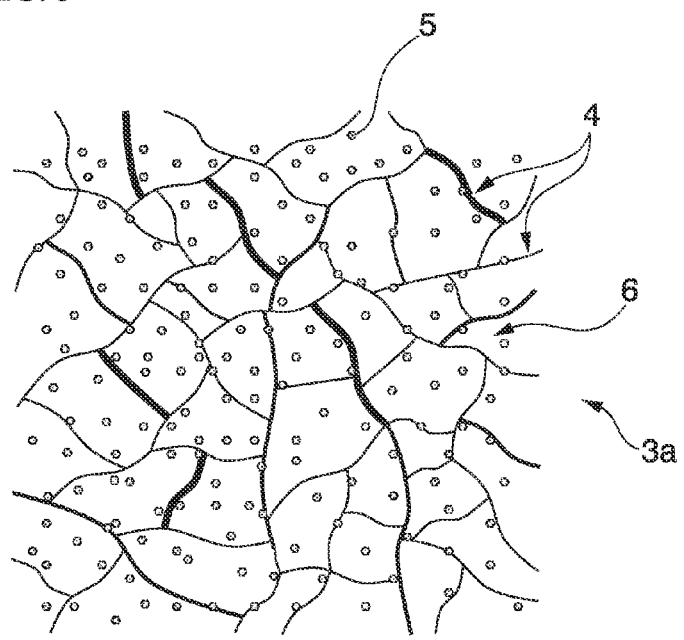
FIG. 3 is a top view schematically illustrating a part of an example of the surface-treated metal according to the embodiment.

FIG. 3 is a top view schematically illustrating a part of an example of the surface-treated metal 1 according to the embodiment. As illustrated in FIG. 3, in the outermost layer 3a of the surface-treated metal 1, the concaves 4 extend in an arbitrary in-plane direction of the outermost layer 3a (direction perpendicular to the thickness direction of the outermost layer 3a). In addition, in the example of FIG. 3, the plurality of concaves 4 are present in a network shape. Based on a sum $A_V$ of areas of the network-shaped concaves 4 (however concaves other than the concaves 4 which do not penetrate the outermost layer 3a are excepted, for example, a concave 4b of FIG. 1A, a concave 4e of FIG. 1B, and a concave 4j of FIG. 1C) and a measured area $A_M$, the coverage $((A_M-A_V)/A_M \times 100\%)$ of the photocatalytic film 3a can be obtained.

(Surface Area of Photocatalytic Film)

In the surface-treated metal 1 according to the embodiment, by the presence of concaves 4 in the photocatalytic film 3a, it is preferable that a surface area (rate of increase of the surface area) of the photocatalytic film 3a be controlled to be 1.01 (times) to 50.0 (times) of a surface area per unit area of the metal 2 which is the substrate. That is, the surface area of the outermost layer 3a is preferably in a range from 101% to 5000% of the area of the surface of the metal 2. This range represents that the surface area of the photocatalytic film 3a increases in a range from 1.01 times to 50 times of the surface area of the metal 2 by the concaves 4 (that is, the surface area of the photocatalytic film 3a, when the surface of the photocatalytic film 3a on the environmental side is completely flat). Due to the introduction of the concaves 4, the surface in contact with the environment is newly formed, and a photocatalytic effect can increase along with an increase in surface area.

For example, it is assumed that the concaves 4 having the same width W (wherein W=t) as the thickness (film thickness) t of the photocatalytic film 3a are introduced. In this example, the surface area of the photocatalytic film 3a is decreased by the area of "t×L (that is, W×L)" by the concaves 4 having the length L, whereas the surface area of the photocatalytic film 3a is increased by the area of "2t×L" by the concaves 4 having the length L. When there are many concaves 4 having a width W (for example W<2t) narrower than the film thickness t, the surface area of the photocatalytic film 3a can be effectively increased by the concaves 4. On the other hand, when there are concaves 4 having a width W wider than two times (2t) of the film thickness t, the surface area of the photocatalytic film 3a is decreased by the introduction of the concaves 4. However, it is difficult to strictly control the widths W of the concaves 4, and concaves 4 having the width W narrower than or equal to 2t are also effectively introduced by the concaves 4 having the width W wider than 2t. Therefore, it is not necessary that concaves 4 having a wide width W are excluded.

In addition, in the embodiment, the photocatalytic film 3a contains the photocatalytic dispersed phase (photocatalytic particles and aggregates thereof) 5. Therefore, surfaces of fractures (a part of or all of the side surfaces 42 of the concave) of the photocatalytic film 3a which are generated by the concaves 4 are not smooth, and small irregularities or pores are present in the photocatalytic film 3a due to the photocatalytic dispersed phase 5. Accordingly, a surface area of the fractures generated by the formation of the concaves 4 is usually greater than "2t×L", and it can be expected that the surface area of the photocatalytic film 3a is effectively increased by the concaves 4.

Regarding an increase in the surface area of the photocatalytic film 3a by the concaves 4, a lower limit of a ratio of the surface area of the photocatalytic film (outermost layer) 3a to the area of the surface of the metal 2 is preferably greater than or equal to 1.01 (greater than or equal to 101%), more preferably greater than or equal to 1.02 (greater than or equal to 102%), still more preferably greater than or equal to 1.05 (greater than or equal to 105%), and particularly preferably greater than or equal to 1.10 (greater than or equal to 110%). In addition, regarding an increase in the surface area of the photocatalytic film 3a by the concaves 4, an upper limit of the ratio of the surface area of the photocatalytic film (outermost layer) 3a to the area of the surface of the metal 2 is preferably less than or equal to 50.0 (less than or equal to 5000%), more preferably less than or equal to 48.0 (less than or equal to 4800%), still more preferably less than or equal to 45.0 (less than or equal to 4500%), and particularly preferably less than or equal to 40.0 (less than or equal to 4000%). When the rate of increase in the surface area is excessively small, an amount of an increase in photocatalytic effect by the introduction of the concaves 4 is not large and may be insufficient. On the other hand, when the rate of increase of the surface area is excessively large, there are no significant problems. However, such formation of the concaves 4 is not realistic.

(Widths of Concave)

The widths W of the concaves 4 present in the coated material 3 to the film thickness t are preferably in a range from 0.01 to 10 (1% to 1000%) by a ratio thereof to the film thickness t. In this way, the desired widths W of the concaves 4 are specified using the ratio thereof to the film thickness t, and the concaves 4 having a width W in this range are present in the coated material 3. As a result, the contamination resistance of the surface-treated metal 1 can be more effectively improved. On the other hand, as described above, when the widths W of the introduced concaves 4 are excessively wide in relation to the film thickness t, the surface area of the photocatalytic film 3a cannot be effectively increased. Therefore, the widths W of the concaves 4 are preferably in a range from 0.01 to 5 (1% to 500%) and more preferably in a range from 0.01 to 2 (1% to 200%) in terms of the ratio thereof to the film thickness t.

In addition, by providing the concaves 4 having the above-described properties (for example, the widths W of the concaves 4 are in a range from 0.01 to 10 by the ratio thereof to the film thickness t) such that a ratio of the lengths thereof to a total length $L_t$ of the concaves 4 is 90% or higher, the contamination resistance of the surface-treated metal 1 can be more effectively improved. When the ratio of the lengths of the concaves 4 having the above-described width W to the total length L of the concaves 4 is small, there are many concaves 4 having an excessively narrow width W or concave having an excessively wide width W. In order to increase the contamination resistance effect by a photocatalyst, it is preferable that the concave 4 having a width W in the above-described range be present in 95% or higher and more preferably in 98% or higher. An upper limit of the ratio of the lengths of the concaves 4 having the above-described width W to the total length L of the concaves 4 is not particularly limited and may be, for example, 100%.

Regarding the measurement of the widths W of the concave 4, it is preferable that as many concaves 4 as possible be measured. However, due to temporal and economical limitations, the widths W can be represented by the measurement results of concaves 4 present in a given range.

Specifically, when the widths W of the concaves 4 are not large in relation to the film thickness t, for example, when the film thickness t is 10 μm and the maximum width W of the concaves 4 is approximately 20 μm to 30 μm, it is only necessary that concaves 4 present in a 100 μm×100 μm area be measured. On the other hand, when the film thickness t is 10 μm and the maximum width W of the concaves 4 is approximately 100 μm, it is preferable that concaves 4 present in a 0.5 mm×0.5 mm area or a 1 mm×1 mm area be measured. In addition, when the film thickness t is 10 μm and the maximum width W of the concaves 4 is approximately 1 μm, it is only necessary that concaves 4 present in a 10 μm×10 μm area or a 20 μm×20 μm area be measured. That is, the properties of all the concaves 4 can be determined by appropriately selecting a measurement area from a 10 μm×10 μm area to a 1 mm×1 mm area according to the thickness t of the photocatalytic film 3a and the widths W of the concaves 4 and measuring concaves 4 present in the selected area. Needless to say, the selected area (measurement area) is not necessarily quadrangle and may be appropriately selected from various shapes such as a circular shape, an elliptical shape, and a polygonal shape.

In addition, as illustrated in FIG. 3, when the coated material 3 is seen in a plan view, the concaves 4 may form a network shape, and sizes of portions of the outermost layer (photocatalytic film) 3a which are surrounded by the concaves 4 may be different from each other. In this case, for example, when a liquid containing organic pollutants is attached on the surface of the photocatalytic film 3a, the organic pollutants are likely to be guided to the concaves 4 having a pattern randomized by capillarity and the like. As a result, contact efficiency (collision frequency) between the organic pollutants and the photocatalytic particles 5 can be improved and the surface-treated metal 1 exhibits high contamination resistance. Furthermore, the production cost of the surface-treated metal 1 can be suppressed as compared to a case in which a pattern is uniformly formed to form the film.

Furthermore, it is preferable that, when the outermost layer 3a is seen in a cross-sectional view taken along the thickness direction thereof using, for example, SEM, a surface opposite the metal 2 among two surfaces facing each other in the thickness direction of the outermost layer 3a has plural flat areas. In this case, for example, when the surface-treated metal 1 is processed using a mold or the like, surface-contacting portions (flat areas) are increased. Therefore, a local stress applied to the photocatalytic film 3a can be reduced. Accordingly, as the surface-treated metal 1, a precoated metal having high workability (for example, bendability and deep drawability) can be provided at a low cost. In this case, a total length of the plural flat areas is preferably 70% to 99% of a length (total length) of the entire surface opposite the metal 2. For example, in a coating process of a production method according to an embodiment described below, these flat areas can be formed on the photocatalytic film 3a using a surface tension of a treatment liquid and the like. When the surface of the metal 2 is set as a reference line (reference surface), surfaces having an angle of 20° or less (which is set in a range (absolute value) from 0° to 90°) from this reference line are defined as the flat areas, and such surfaces are linearly approximated and evaluated. In addition, when the side surfaces 42 of the concaves 4 have a steep slope (for example, when side surfaces 42 of concaves 4 having an angle in a range of 70° to 90° from the reference line are 70% to 100% of all the side surfaces 42 of the concaves 4), a contact efficiency (collision frequency) between contaminants which are incorporated into grooves of the concaves 4 and the photocatalytic particles 5 can be improved, and the surface-treated metal 1 can exhibit high contamination resistance.

Recessed portions in a cross-section of the surface-treated metal 1 are defined as the concaves 4. Therefore, for example, when only the photocatalytic film 3a is taken into consideration, the concaves 4 may have a hole shape. However, hereinafter, such a case will be also described as the concaves 4 being formed on the photocatalytic film 3a.

(Photocatalytic Particles)

The surface-treated metal 1 according to the embodiment includes the coated material 3 having one or more layers of the coating layers 3a to 3e on the surface of the metal 2. The coated material 3 includes the photocatalytic film 3a, which contains at least one type of photocatalytic particles 5 in a volume ratio range of 0.50% to 50%, as the outermost layer 3a.

Preferable examples of the photocatalytic particles 5 include titanium oxide, zinc oxide, cerium oxide, tin oxide, bismuth oxide, indium oxide, zirconium oxide, tungsten oxide, chromium oxide, molybdenum oxide, iron oxide, nickel oxide, ruthenium oxide, cobalt oxide, copper oxide, manganese oxide, germanium oxide, lead oxide, cadmium oxide, vanadium oxide, niobium oxide, tantalum oxide, rhodium oxide, rhenium oxide, barium titanate, strontium titanate, and iron titanate. Among these, titanium oxide, zinc oxide, tin oxide, zirconium oxide, tungsten oxide, iron oxide, and niobium oxide are more preferable from the viewpoint of showing high activity even when a heat treatment is performed at a low temperature of 100° C. or lower. Among these, a titanium oxide having an anatase-type structure is particularly preferable from the viewpoint of showing high activity as a photocatalyst.

The amount of the photocatalytic particles 5 is preferably greater than or equal to 0.5%, more preferably greater than or equal to 1.0%, and still more preferably greater than or equal to 2.0% by volume ratio (vol %) thereof to the total volume of the photocatalytic film 3a. In addition, the amount of the photocatalytic particles 5 is preferably less than or equal to 50%, more preferably less than or equal to 45%, and still more preferably less than or equal to 40% or 30% by volume ratio (vol %) thereof to the total volume of the photocatalytic film 3a. When the amount of the photocatalytic particles 5 is less than 0.5% by volume ratio, it is difficult to exhibit a contamination resistance function by a photocatalytic effect. On the other hand, when the amount of the photocatalytic particles 5 is greater than 50% by volume ratio, a sufficient contamination resistance function is exhibited, but the decomposition and deterioration of the organic-inorganic composite resin 6 constituting the photocatalytic film 3a is promoted. The organic-inorganic composite resin 6 of the photocatalytic film 3a which is used in the embodiment is difficult to decompose and deteriorate with a photocatalyst. However, when the amount of the photocatalyst is excessively large, it is difficult to obtain superior contamination resistance for a long period of time. In addition, by suppressing an upper limit of the amount of the photocatalyst, the cost can be suppressed.

In addition, as described above, since the cross-sections 42 of the concaves 4 are not smooth, it can be expected that the surface area of the photocatalytic film 3a is increased by the introduction of the concaves 4. This effect is particularly high when the photocatalytic film 3a contains a given amount or greater of the photocatalyst. Accordingly, the amount of the photocatalytic particles 5 in the photocatalytic film 3a is preferably greater than or equal to 3.0% and most preferably greater than or equal to 5.0% by volume ratio.

The particle size of the photocatalytic particles 5 to be used is not particularly limited, and a photocatalyst having any particle size can be used. However, by using photocatalytic particles having a small particle size (primary particle size), the photocatalytic effect of the embodiment can be improved. That is, since photocatalytic particles having a small average primary particle size have higher photocatalytic activity than that of photocatalytic particles having a large average primary particle size, a superior contamination resistance effect can be obtained by the photocatalytic particles having a small average primary particle size.

The average primary particle size of the photocatalytic particles 5 is more preferably less than or equal to 100 nm, still more preferably less than or equal to 50 nm or 30 nm, and most preferably less than or equal to 20 nm. In addition, it is also preferable that the average primary particle size of the photocatalytic particles 5 be in the above-described range from the viewpoint of increasing the surface area by the introduction of the concave portion 4. In addition, in order to further increase the surface area, the above-described small photocatalytic particles 5 may form aggregates (aggregated particles) having an appropriate size. The size of the aggregates of the photocatalytic particles 5 is not particularly limited, but a lower limit thereof is preferably greater than or equal to 0.5 μm and more preferably greater than or equal to 1.0 μm. In addition, an upper limit of the size of the aggregates of the photocatalytic particles 5 is preferably less than or equal to 5.0 μm. When the size of the aggregates is greater than or equal to 0.5 μm or greater than or equal to 1.0 μm, there is a sufficient or significant difference between the size of the aggregates and the size of the primary particles. As a result, an effect of increasing the surface area by the formation of the aggregates can be improved. In addition, when the size of the aggregates is less than or equal to 5.0 μm, the size of the aggregated particles is controlled in relation to the thickness of the photocatalytic film, and a favorable external appearance can be secured.

Furthermore, in order to more efficiently utilize the increase in the surface area of the photocatalytic film 3a by the concaves 4, the photocatalytic dispersed phase 5 containing a photocatalyst of the outermost layer (photocatalytic film) 3a may have two or more dispersed particle sizes and a particle size distribution thereof may include two or more maximum values. This characteristic can be achieved by the following particle size distribution control methods (A) to (D).

(A) Photocatalysts which are the same materials showing photocatalytic activity and have different particle size distributions of primary particles are mixed with each other.

(B) A plurality of types of photocatalysts which are all different materials showing photocatalytic activity and have different particle size distributions of primary particles are mixed with each other.

(C) By using photocatalysts which are the same materials showing photocatalytic activity, a particle size distribution of primary particles and a particle size distribution of secondary particles (aggregates) are controlled.

(D) By using a plurality of types of photocatalysts which are all different materials showing photocatalytic activity, particle size distributions are controlled such that when one photocatalyst forms a particle size distribution of primary particles, the other photocatalyst forms a particle size distribution of secondary particles (aggregates).

As a method other than the methods (A) to (D), by using a plurality of types of photocatalysts which are all different materials showing photocatalytic activity and controlling particle size distributions such that particle size distributions of secondary particles of the respective photocatalysts are different from each other, the photocatalytic effect can be improved immediately after usage starts. However, it is difficult to control particle size distributions of secondary particles of different materials in one coating system. Therefore, when particle size distributions are controlled, it is preferable that the above-described particle size distribution control methods (A) to (D) be applied.

Figure 4:
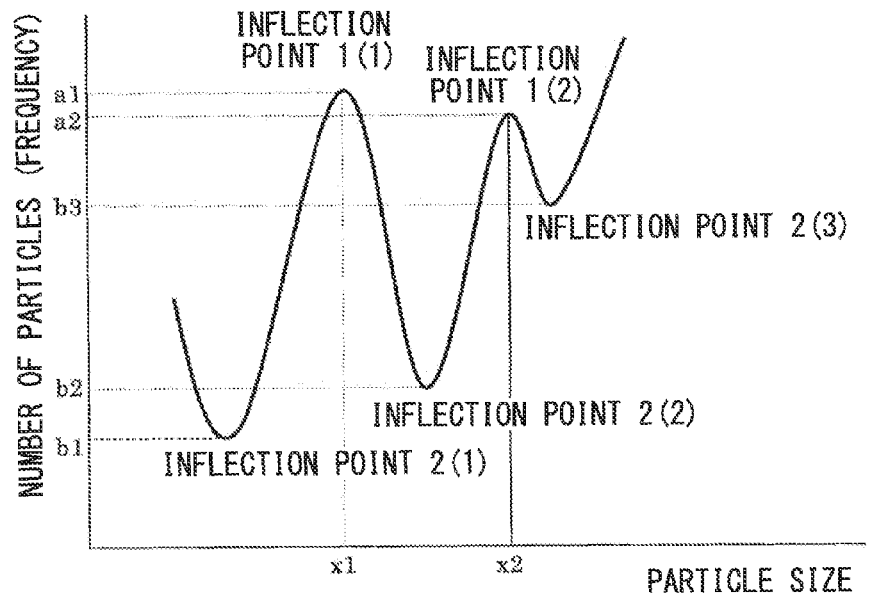
FIG. 4 is a graph illustrating a predetermined maximum value for explanation.

In the above-described particle size distribution control, when the photocatalytic film 3a contains secondary particles (aggregates), one type of secondary particles are used as one type of particles, the photocatalytic particles 5 present in the photocatalytic film 3a have a particle size distribution from small particles (primary particles) to large aggregates, and this particle size distribution has two or more predetermined maximum values. In this case, as illustrated in FIG. 4, the maximum value refers to a central point (inflection point 1) of particle sizes in the particle size range, when the number (frequency) of particles belonging to the specific particle size range (for example, class) is shifted from an increase to a decrease. In this definition, there is a large variation in the particle size distribution, and there are many maximum values when an increase and a decrease of the number of particles are repeated in particle size ranges adjacent to each other. Therefore, by using an inflection point 2 (a central point or minimum value of particle sizes in the particle size range when the number (frequency) of particles belonging to the specific particle size range is shifted from a decrease to an increase) in the opposite direction which is present between two inflection points 1 (when three or more inflection points 1 are present, two arbitrary inflection points adjacent to each other are selected) as a reference, an inflection point 1 of which the numbers (frequency) of particles is 1.5 times or greater than the number (frequency) of the inflection point 2 is defined (refer to FIG. 4.) as a maximum value (predetermined maximum value). In FIG. 4, two inflection points 2 adjacent to inflection points 1 (1(1) and 1(2)) are present (actually, there is also a case where one inflection point 2 adjacent to the inflection points 1 may be present). An inflection point 1 which satisfies the above-described relationship with the one or two inflection points 2 is defined as a predetermined maximum value. For example, when an example of FIG. 4 is used for description, the inflection point 1(1) is a predetermined maximum value because $a1 \geq 1.5 \times b1$ and $a1 \geq 1.5 \times b2$ are satisfied. On the other hand, the inflection point 1(2) is not a predetermined maximum value because $a2 \geq 1.5 \times b2$ is satisfied but $a2 \geq 1.5 \times b3$ is not satisfied.

That is, when the particle size distribution of the photocatalytic particles 5 is controlled, it is preferable that the particle size distribution based on the number of the photocatalytic particles 5 has a plurality of maximum values and minimum values which are present between adjacent maximum values in the plurality of maximum values, and that two or more maximum values in the plurality of maximum values has a number frequency which is 1.5 times or greater of number frequencies of minimum values adjacent to the maximum values thereof. Hereinafter (the following embodiment and examples), the maximum value refers to the predetermined maximum value unless specified otherwise.

With the above-described particle size distribution control, photocatalytic particles having a large particle size or dispersed particle size improves contamination resistance on the surfaces and fractures (a part of or all of the side surfaces 42 of the concave) of the photocatalytic film 3a in the initial stage, and photocatalytic particles having a small particle size and a high dispersion state further improves contamination resistance for a long period of time. Accordingly, by the particle size distribution control of photocatalytic particles having two or more dispersion states, superior contamination resistance can be maintained for a long period of time from the initial stage.

Even when the number of maximum values is large, there are no significant problems. However, 10 or less maximum values are sufficient. The particle size (central point in a particle size range, for example, x1 in FIG. 4) corresponding to the maximum values is not particularly limited. When at least one of maximum values is present in a particle size range of 100 nm or less and one of the other maximum values is present in a particle size range of 500 nm or greater, more preferable contamination resistance can be obtained in the initial and intermediate stages. It is still more preferable that at least one of maximum values is present in a particle size range of 50 nm or less and one of the other maximum values is present in a particle size range of 600 nm or greater. In this way, when the maximum values of the particle size distribution of the photocatalytic particles 5 are controlled, a more preferable contamination resistance effect by a photocatalyst can be obtained for a long period of time from the initial stage. An upper limit of the particle size range of the photocatalytic particles 5 relating to the maximum values is not particularly limited but, for example, is preferably 5.0 μm (5000 nm) in consideration of the dispersibility of the photocatalytic particles 5 and the like.

When the photocatalytic particles 5 have two maximum values of particle size, by volume ratio with respect to the entire photocatalytic particles 5, it is preferable that photocatalytic particles having a maximum value corresponding to a small particle size be 5% to 80% and photocatalytic particles having a maximum value corresponding to a large particle size be 20% to 95%, it is more preferable that photocatalytic particles having a maximum value corresponding to a small particle size be 10% to 80% and photocatalytic particles having a maximum value corresponding to a large particle size be 20% to 90%, and it is still more preferable that photocatalytic particles having a maximum value corresponding to a small particle size be 20% to 70% and photocatalytic particles having a maximum value corresponding to a large particle size be 30% to 80%. When photocatalytic particles having a maximum value corresponding to a small particle size and photocatalytic particles having a maximum value corresponding to a large particle size are in the above-described ranges, a preferable contamination resistance effect by a photocatalyst can be obtained for a long period of time from the initial stage, and deterioration in the film by a photocatalyst can be suppressed to the minimum. In addition, when the photocatalytic particles 5 have three or more maximum values of particle size, a total volume ratio of photocatalytic particles having a maximum value in a particle size range of 100 nm or less and photocatalytic particles having a maximum value in a particle size range of 500 nm or greater to all the photocatalytic particles 5 is preferably greater than or equal to 50%, more preferably greater than or equal to 60%, and still more preferably greater than or equal to 70%. In this case, as in the case in which the photocatalytic particles 5 have two maximum values of particle size, a preferable contamination resistance effect by a photocatalyst can be obtained for a long period of time from the initial stage, and deterioration in the film by a photocatalyst can be suppressed to the minimum.

Here, a method of measuring a particle size distribution of the photocatalytic particles 5 in the photocatalytic film 3a will be described.

In order to measure the particle size distribution, a cross-section of the photocatalytic film 3a is observed using a microscope, and the size of particles to be observed is directly measured. It is preferable that a microscope to be used be selected according to the particle size distribution of particles to be observed. That is, when particles having a relatively large size of μm order are observed, a scanning electron microscope (SEM) is used, and when particles having a relatively small size of nm level are observed, a transmission electron microscope (TEM) is used. By using these microscopes together, the photocatalytic particles 5 can be effectively observed. A cutting direction of observation particles is not particularly limited and can be determined according to the thickness of the photocatalytic film 3a and the particle size distribution of the photocatalytic particles 5 in a range in which there is no variation in the measurement. In addition, the rate (mass % and vol %) of the photocatalytic particles 5 (including aggregates) in the photocatalytic film 3a can be simultaneously measured along with the above-described measurement of the particles size distribution. That is, the volume ratio (vol %) of the photocatalytic particles 5 can be calculated from an area ratio of the photocatalytic particles 5 in the cross-section of the photocatalytic film 3a. From this volume ratio and the true density of the photocatalytic particles 5, the mass ratio (mass %) of the photocatalytic particles 5 can be calculated. In consideration of the resolution of the measurement method and the like, a lower limit of the average primary particle size of the photocatalytic particles 5, and a lower limit of the particle size range of the photocatalytic particles 5 relating to the above-described maximum values may be 0.5 nm.

In this method, in order to obtain the particle size distribution of the photocatalytic particles 5 in the photocatalytic film 3a, it is preferable that the particle sizes of all the photocatalytic particles 5 be measured from the viewpoint of obtaining the particle size distribution with high precision. However, since there are significant problems in such a method, it is impossible to conduct the method. Therefore, all the particle sizes (particle size distribution) can be represented by measuring the particle sizes of a part of particles which are extracted with a random method. As a result of investigating particles having an already-known average particle size, the present inventors found that the average particle size can be obtained almost without error by measuring particle sizes of 500 or more, preferably, 1000 or more particles. However, since it is considerably difficult to measure 500 to 1000 particles, the particle size may be automatically measured with a method such as image processing. In this method, when particles form moderate aggregates, aggregated particles may be determined as primary particles. Therefore, even when a resin or the like is contained in an aggregate, image processing or the like is set such that an outline of the aggregate on the outermost side is determined as a particle surface.

As the methods for making two or more maximum values present in the particle size distribution, the above-described four methods (A) to (D) are usually used.

First, cases in which photocatalysts having different primary particle sizes are used in combination as in the cases of the above methods (A) and (B) will be described.

Examples of a case in which two or more maximum values (the above-described predetermined maximum values) are formed in a particle size distribution by primary particles of the same material showing photocatalytic activity include a case in which the photocatalytic film 3a contains mixed particles prepared by mixing $TiO_2$ having an average primary particle size of 10 nm with $TiO_2$ having an average primary particle size of 800 nm. In this case, the material showing photocatalytic activity is titanium oxide. In addition, when primary particles of a photocatalyst are small, in order to realize the above-described particle size distribution, the photocatalyst may be supported by a carrier such as an inorganic porous material having the desired particle size distribution. Even in this case, when at least one of maximum values of a particle size distribution of primary particles is present in a particle size range of 100 nm or less and at least one of the other maximum values is present in a particle size range of 500 nm or greater, more preferable contamination resistance can be obtained in the initial and intermediate stages. In addition, it is still more preferable that at least one of maximum values of a particle size distribution of primary particles is present in a particle size range of 50 nm or less and at least one of the other maximum values is present in a particle size range of 600 nm or greater. When the above-described supported photocatalyst is used, it is preferable that a particle size distribution of the photocatalyst including the carrier satisfy the above-described particle size distribution. In addition, examples of a case in which two or more maximum values (the above-described predetermined maximum values) are formed in a particle size distribution by primary particles of different materials showing photocatalytic activity include a case in which the photocatalytic film 3a contains mixed particles prepared by mixing $TiO_2$ having an average primary particle size of 10 nm with ZnO having an average primary particle size of 1000 nm.

Next, cases in which a particle size distribution of primary particles and a particle size distribution of secondary particles (aggregates) are combined as in the cases of the above methods (C) and (D) will be described. In such a method, a particle size distribution having 2 to 10 maximum values can be obtained.

Since the particle size distribution of secondary particles changes depending on the types of dispersed particles and a matrix, a dispersing method, dispersing conditions, and the like, the particle size distribution of secondary particles is generally difficult to control. Therefore, in the cases of the methods (C) and (D), photocatalysts having different dispersion states, particularly, different positions of maximum values of the particle size distributions are mixed with each other in advance, and the photocatalytic film 3a is formed while maintaining the dispersion states and the particle size distributions as they are as much as possible.

For example, by using powdered photocatalytic particles as one material showing photocatalytic activity and using particles (material) in the sol state as the other material showing photocatalytic activity, a particle size distribution having the two or more predetermined maximum values can be obtained. In this case, one material showing photocatalytic activity may be different from the other material showing photocatalytic activity.

In addition, when the above-described particle size distribution control is performed, the amount of the photocatalytic particles 5 in the photocatalytic film 3a on the surface of the surface-treated metal 1 may be 0.5% to 50% by mass ratio. By controlling the amount of the photocatalytic particles 5 in the photocatalytic film 3a to be 0.5 mass % to 50 mass %, good cost balance and long lifetime of the film can be obtained while securing sufficient contamination resistance. The amount of the photocatalytic particles 5 is preferably greater than or equal to 1.0 mass % and more preferably greater than or equal to 2.5 mass %. In addition, the amount of the photocatalytic particles 5 is more preferably less than or equal to 40 mass % and still more preferably less than or equal to 35 mass %. In addition, in consideration of a difference in specific gravity (difference in density) between the photocatalytic particles 5 and the matrix resin 6 in the photocatalytic film 3a, it is preferable that the content of the photocatalytic particles 5 be, for example, greater than or equal to 0.5 vol %, greater than or equal to 1.0 vol %, or greater than or equal to 2.5 vol % and be, for example, less than or equal to 45 vol %, less than or equal to 35 vol %, or less than or equal to 30 vol %

(Matrix Resin of Photocatalytic Film)

In the surface-treated metal 1 according to the embodiment, the matrix resin 6 constituting the photocatalytic film 3a also has a significant characteristic. That is, even when the matrix resin 6 is used in combination with a photocatalyst, the decomposition and deterioration of the matrix resin 6 by the photocatalyst is extremely small. Hereinafter, the matrix resin 6 will be described in detail.

First, the matrix resin 6 includes an inorganic skeleton, which is developed in a three-dimensional network structure, as a main structure and contains an inorganic siloxane bond represented by $\equiv$Si—O—Si$\equiv$ as a main bond of the main skeleton. The structure containing this siloxane bond as a major component contains at least one selected from the group consisting of an alkyl group having 1 to 12 carbon atoms, an aryl group, a carboxyl group, an amino group, and a hydroxyl group. As a result, the surface-treated metal 1 also has, for example, workability which is required for a pre-coated film in addition to superior stability to a photocatalyst and weather resistance. The present inventors presume the reason for this to be that stability to a photocatalyst and weather resistance of the photocatalytic film 3a are secured by the structure containing the inorganic siloxane bond as a major component, and flexibility is given to the film and superior workability is secured by the above-described functional group controlling the crosslinking density of the resin and by the organic group.

Examples of the alkyl group having 1 to 12 carbon atoms include a methyl group, an ethyl group, a propyl group, a butyl group, a hexyl group, a 2-ethylhexyl group, and a dodecyl group, and examples of the aryl group include a phenyl group, a tolyl group, a xylyl group, and a naphthyl group. In addition, the carboxyl group represents —COOH, the amino group represents —NH$_2$, and the hydroxyl group represents —OH.

(Organic Components in Matrix Resin)

In the embodiment, the matrix resin 6 may contain two or more types of organic components as an organic component. Among these, a major organic group, that is, an organic group having the greatest content in the matrix resin 6 is preferably an alkyl group or an aryl group. In this case, the number of carbon atoms in the alkyl group is preferably more than or equal to 1. In addition, the number of carbon atoms in the alkyl group is preferably less than or equal to 12, more preferably less than or equal to 10, and still more preferably less than or equal to 8 or 6. In this way, as the number of carbon atoms in the alkyl group is smaller, the alkyl group is more easily used as an organic group. Likewise, the number of carbon atoms in the aryl group is greater than or equal to 6, but is preferably less than or equal to 12, more preferably less than or equal to 11, and still more preferably less than or equal to 10 or 8. In this way, as the number of carbon atoms in the aryl group is smaller, the aryl group is more easily used as an organic group. Among these, the most preferable organic group is a phenyl group. By using only a phenyl group as an organic group in combination with the siloxane bond forming the main skeleton, the photocatalytic film 3a having superior stability to a photocatalyst, weather resistance, workability, and adhesion during a process can be obtained. These organic components may be present in the main skeleton of the matrix resin 6 or may be present in a side chain of the matrix resin 6. When these components are present in the photocatalytic film 3a, the above-described various properties of the photocatalytic film 3a can be further improved.

(Bond Other than Siloxane Bond)

Examples of a bond other than the siloxane bond include an ether bond such as —CH$_2$—CH(CH$_2$)—O—CH$_2$—, and an amino bond such as secondary or tertiary amine. Among these, when the photocatalytic film 3a contains either or both of an ether bond and an amino bond in either or both of the main structure and a side chain of the film structure, the film having particularly stability to a photocatalyst and workability can be obtained.

(Thickness of Photocatalytic Film)

The thickness t of the photocatalytic film 3a varies depending on required properties or the use, and a lower limit thereof is preferably greater than or equal to 0.01 µm, more preferably greater than or equal to 0.05 µm and still more preferably greater than or equal to 0.1 µm. Likewise, an upper limit of the thickness t of the photocatalytic film 3a is preferably less than or equal to 25 µm, more preferably less than or equal to 20 µm, and still more preferably less than or equal to 10 µm. When the film thickness t is 0.01 µm to 25 µm, the controllability in the coverage of the photocatalytic film 3a is improved, higher photocatalytic performance can be obtained, and higher moldability and higher adhesion during a process can be obtained. In addition, when a thick film is formed due to the properties of the film which forms a matrix, the film may be formed through multiple operations in order to suppress cracking, peeling, and the like. For example, when a film having a predetermined thickness or larger is formed, it is preferable that coating and drying (solidifying) described below be repeated.

(Metal Elements in Photocatalytic Film Other than Si)

In the embodiment, the matrix resin 6 contains Si as a metal element, but may further contain, as an element other than Si, one or more metal elements selected from B, Al, Ge, Ti, Y, Zr, Nb, Ta, and the like. Among these metal elements, Al, Ti, Nb, and Ta function as a catalyst for completing the solidification of a film at a low temperature or within a short period of time when an acid is added to a system (for example, a photocatalytic film-forming treatment liquid described below) as a catalyst. When a metalalkoxide is added to the system using an acid as a catalyst, the ring-opening rate of an epoxy increases, and a film can be cured at a low temperature within a short period of time. In particular, an alkoxide of Ti such as Ti-ethoxide or Ti-isopropoxide is frequently used as a material. In addition, in a system containing Zr, since alkali resistance of a film is improved, a matrix resin containing Zr is preferably used particularly when alkali resistance is required.

In the photocatalytic film 3a, it is preferable that the dispersed phase (the photocatalytic particles 5 and the other particles) be uniformly dispersed. However, it is not necessary that the dispersed phase be uniformly dispersed. For example, the dispersed phase may form aggregates, the concentrations of the dispersed phase between the outermost portion and the inside of the photocatalytic film 3a may be different from each other, and the concentration of the dispersed phase may have a gradient. In such cases, since superior contamination resistance effect and superior other properties may be obtained, it is not necessary that the dispersed phase be uniformly dispersed.

(Substrate)

The metal 2 which is the substrate of the surface-treated metal 1 according to the embodiment is not limited in characteristics thereof (including material, shape, whether being treated or not, and whether being a final product (shape) or not), and any metals can be desirably used as the metal 2. For example, as the metal 2 (material), various metals such as steel, stainless steel, titanium, aluminum, and aluminum alloys, and plated metal sheets having a plated layer which is obtained by plating the above-described metals can be preferably used. In addition, as the metal 2 (shape), molded materials such as steel sections, steel plates, steel sheets, pipes and tubes, bars, and wire rods can be preferably used.

Among these, particularly preferable examples of the metal include a steel sheet, a stainless steel sheet, a titanium sheet, a titanium alloy sheet, an aluminum sheet, an aluminum alloy sheet, a plated metal sheet obtained by plating the above-described metal sheets, and a prepainted steel sheet obtained by forming an organic coating film on the above-described metal sheets. Examples of the coated steel plates and sheets include a galvanized steel sheet, a zinc-iron alloy coated steel sheet, a zinc-nickel alloy coated steel sheet, a zinc-chromium alloy coated steel sheet, a zinc-aluminum alloy coated steel sheet, an aluminized steel sheet, a zinc-aluminum-magnesium alloy coated steel sheet, a zinc-aluminum-magnesium-silicon alloy coated steel sheet, an aluminum-silicon alloy coated steel sheet, a galvanized stainless steel sheet, and an aluminized stainless steel sheet.

Examples of the stainless steel sheet include an austenitic stainless steel sheet, a ferritic stainless steel sheet, and a martensitic stainless steel sheet. Regarding the thickness of the stainless steel sheet, stainless steel sheets having various thicknesses from a thick stainless steel sheet having a thickness of about several tens of mm to a so-called stainless steel foil of which the thickness is reduced to about 10 μm by rolling can be used. The surfaces of the stainless steel sheet and the stainless steel foil may be subjected to a surface treatment such as bright-annealing or buffing.

Examples of the aluminum alloy sheet include JIS 1000 series (pure Al series). JIS 2000 series (Al—Cu series), JIS 3000 series (Al—Mn series). JIS 4000 series (Al—Si series). JIS 5000 series (Al—Mg series), JIS 6000 series (Al—Mg—Si series), and JIS 7000 series (Al—Zn series).

In addition, when the photocatalytic film 3a is formed on a metal other than prepainted steel sheet, the photocatalytic film 3a may be formed directly on the metal 2 or may be formed on the metal 2 on which another coating layer (including a pre-treatment film) is formed. For example, the photocatalytic film 3a may be formed on a surface of a metal on which a chromate conversion coating is formed by chromating or on a surface of a metal which is subjected to a surface treatment (for example, phosphating) other than chromating.

The above-described photocatalytic film 3a can also be formed directly on, for example, a surface of an organic coating film of resin-based. As described above repeatedly, this is because the organic-inorganic composite resin 6 which is the matrix of the photocatalytic film 3a does not substantially deteriorate due to a photocatalyst and thus, even when photocatalytic particles are present in the interface between the photocatalytic film 3a and an organic coating film, the deterioration of the organic coating film can be suppressed.

On the other hand, when it is desired that the deterioration of a lower layer film by a photocatalyst is completely suppressed, an intermediate layer (protective layer) may be provided between the lower layer film and the photocatalytic film 3a. When a film not containing the photocatalytic particles 5 is used as this intermediate layer, this film does not substantially deteriorate. Therefore, most of compositions can be used as a film of the intermediate layer. In particular, the above-described organic-inorganic composite resin 6, that is, the matrix resin which is used on the photocatalytic film 3a of the outermost surface may be used without being mixed with a photocatalyst.

(Configuration of Coating Layer of Coated Material)

Figure 1B:
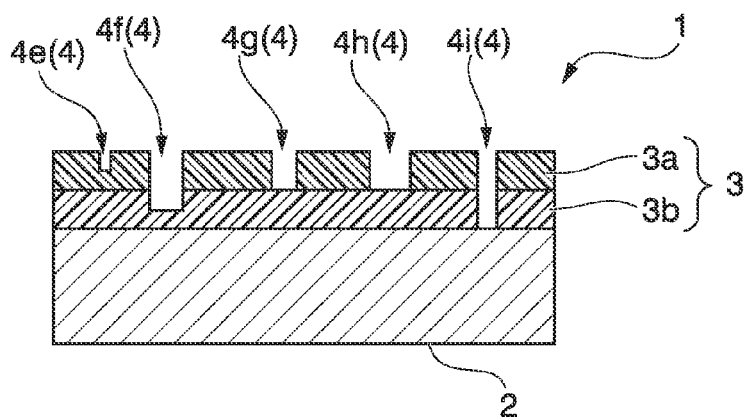
FIG. 1B is a vertical cross-sectional view schematically illustrating a part of another example of the surface-treated metal according to the embodiment.
Figure 1C:
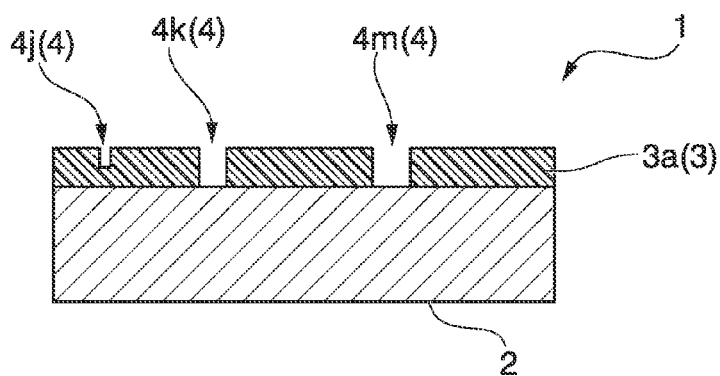
FIG. 1C is a vertical cross-sectional view schematically illustrating a part of still another example of the surface-treated metal according to the embodiment.

FIGS. 1B and 1C are vertical cross-sectional view illustrating a part of other examples of the surface-treated metal according to the embodiment. The coating layer (number of layers) of the coated material 3 may include a single layer as illustrated in FIG. 1C or may include two or more layers as illustrated in FIGS. 1A and 1B. For example, when one type of treatment liquid is coated in multiple layers, the same type of continuous layers is considered as one layer.

Furthermore, in order to further increase an effect of improving contamination resistance using the above-described concaves 4 or to further increase the deformability (workability) of the coated material 3, the coated material 3 may include a second layer 3b in contact with the outermost layer 3a between the outermost layer (photocatalytic film) 3a and the metal 2.

In this case, for example, in order to further improve the deformability of the coated material 3, a ratio of a micro-Vickers hardness of the second layer 3b to a micro-Vickers hardness of the outermost layer 3a may be 0.20 to 0.95. In this way, by controlling the hardness ratio of the outermost layer 3a and the second layer 3b, the workability of the coated material 3 can be increased while relaxing stress concentration in the coated material 3 during processing, and the sound surface-treated metal 1 can be obtained. In order to further increase the workability of the coated material 4, regarding the above-described micro-Vickers hardness ratio, the lower limit thereof is more preferably greater than or equal to 0.30 and still more preferably greater than or equal to 0.50, and the upper limit thereof is more preferably less than or equal to 0.90 and still more preferably less than or equal to 0.85. The micro-Vickers hardnesses of the outermost layer 3a and the second layer 3b can be obtained by measuring (measuring at least 10 points which are statistically sufficient) a cross-section (cross-section illustrated in FIGS. 1A to 1C) of the surface-treated metal 1. Regarding the outermost layer 3a, the surface (surface illustrated in FIG. 3) of the surface-treated metal may be measured.

In addition, for example, in order to further increase the effect of improving contamination resistance using the above-described concaves 4, a water contact angle of the second layer 3b may be in a range obtained by adding 10° to 80° to a water contact angle of the outermost layer 3a. The upper limit of this range is more preferably less than or equal to 70° and still more preferably less than or equal to 60°. In this way, by controlling a relationship regarding hydrophilicity between the outermost layer 3a and the second layer 3b, the adhesion of organic pollutants on the bottoms 41 of the concave can be suppressed. Examples of a method of obtaining such a second layer 3b include a method of increasing organic components (organic groups) of the second layer 3b to be more than that of the outermost layer 3a, a method of decreasing the amount of a photocatalyst added to the second layer 3b to be less than that added to the outermost layer 3a, and a method of controlling the hydrophilicity of the second layer 3b due to dispersing a hydrophilic dispersoid and a hydrophobic dispersoid in the second layer 3b. Regarding the water contact angle, a measurement portion is irradiated with ultraviolet rays, and a contact angle of water on each layer is measured in a room having a illuminance of about 300 lux using a sessile drop method (for example, refer to JIS R3257 (1999)). The water contact angle of the second layer 3b can be determined by using a sample in which a photocatalytic film is not formed or by using a sample in which a photocatalytic film is removed with a physical or chemical method.

The surface-treated metal 1 according to the embodiment can be provided as a material before a processing (materials for various processing) or can be provided as a component after a processing. A provided component is not particularly limited and can be desirably used for building materials such as an outer wall of a house or a sizing material, outdoor home electric appliances such as an outdoor unit of an air conditioner or a housing (outer plate) of a water heater, and outdoor machines such as automobiles.

Hereinafter, a method of producing a surface-treated metal according to an embodiment of the invention will be described in detail.

Figure 5:
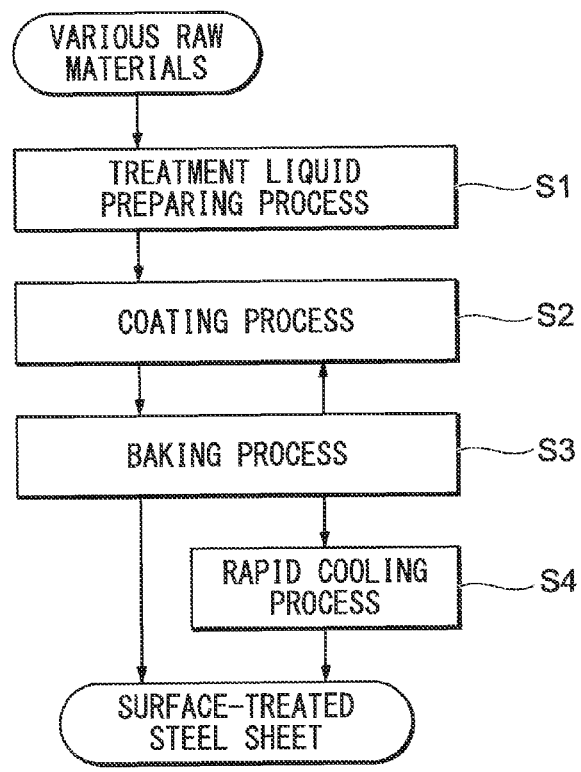
FIG. 5 is a flowchart illustrating an example of a method of producing a surface-treated metal according to an embodiment of the invention.

FIG. 5 is a flowchart illustrating an example of the method of producing a surface-treated metal according to the embodiment. In the method of producing a surface-treated metal according to the embodiment, by using various materials (a substrate containing a metal and raw materials for a treatment liquid) with a method illustrated in FIG. 5, a coated material including a photocatalytic film on the outermost layer thereof is formed on a surface of a substrate containing a metal. That is, the method of producing a surface-treated metal according to the embodiment includes a process (treatment liquid preparing process: S1) of mixing particles showing photocatalytic activity with a liquid which contains a hydrolysate of an alkoxysilane to prepare a photocatalytic film-forming treatment liquid (first treatment liquid), a process (coating process: S2) of coating the photocatalytic film-forming treatment liquid such that the photocatalytic film-forming treatment liquid covers an outermost layer of the coated material, and a process (baking process: S3) of baking the coated photocatalytic film-forming treatment liquid. In addition, the method of producing a surface-treated metal according to the embodiment may further include a process (rapid cooling process: S4) of rapidly cooling the film obtained after the baking process.

First, a treatment liquid used in the treatment liquid preparing process (S1) will be described.

(Photocatalytic Film-Forming Treatment Liquid)

The photocatalytic film-forming treatment liquid (first treatment liquid) used in the method of producing a surface-treated metal according to the embodiment contains a liquid, which contains a composition (hydrolysate) of an alkoxysilane having at least one group selected from the group consisting of an aryl group, a carboxyl group, an amino group, a hydroxyl group, and an alkyl group having 1 to 12 carbon atoms, and photocatalytic particles (particles showing photocatalytic activity). In particular, a preferable treatment liquid contains, as a major component, a composition (including a hydrolysate) derived from tetraalkoxysilane, and at least one alkoxysilane selected from the group consisting of an alkoxysilane which contains an alkyl group having 1 to 12 carbon atoms and an alkoxysilane which contains an aryl group, and the preferable treatment liquid contains photocatalytic particles as a dispersoid. Examples of the tetraalkoxysilane include tetramethoxysilane, tetraethoxysilane, tetrapropoxysilane, and tetrabutoxysilane. In addition, examples of the alkoxysilane which contains an alkyl group having 1 to 12 carbon atoms include methyltrimethoxysilane, dimethyldimethoxysilane, methyltriethoxysilane, dimethyldiethoxysilane, hexyltrimethoxysilane, hexyltriethoxysilane, decyltrimethoxysilane, and decyltriethoxysilane. Examples of the alkoxysilane which contains an aryl group include phenyltrimethoxysilane, diphenyldimethoxysilane, phenyltriethoxysilane, and diphenyldiethoxysilane. In addition, a part or all of the photocatalytic particles may form aggregates.

The photocatalytic film-forming treatment liquid contains, as a major component, the above-described silane compounds, hydrolysates thereof, and a composition derived from silane compounds such as polymers (polycondensates), and condensates. By using the above-described components, an organic-inorganic composite resin, which contains a siloxane bond as a main bond of a main skeleton thereof and contains at least one group selected from the group consisting of an alkyl group having 1 to 12 carbon atoms, an aryl group, a carboxyl group, an amino group, and a hydroxyl group, can be easily obtained. In addition, by using the above-described components, a ratio of organic components to inorganic components in the composite resin can be easily changed. In addition, the type and amount of organic components introduced into the resin can be easily controlled. That is, according to properties required for the photocatalytic film, inorganic components in the organic-inorganic composite resin can increase or, conversely, organic components can increase. Furthermore, the type of organic components to be added can be appropriately selected according to properties required for the photocatalytic film. In addition, as a mere example, when a thin film is formed using the above-described resin, it is substantially unnecessary that the workability of the film be considered. Therefore, the photocatalytic film can be used as a film mainly composed of inorganic components having smaller deterioration by a photocatalyst. On the other hand, when organic components are added to the treatment liquid to some extent, resin components can be designed in consideration of balance between workability and flexibility, and resistance to the deterioration of the film by a photocatalyst.

The photocatalytic film-forming treatment liquid used in the method of producing a surface-treated metal steel sheet according to the embodiment may further contain an alkoxysilane having an epoxy group and an alkoxysilane having an amino group. Preferable examples of the alkoxysilane having an epoxy group include γ-glycidoxypropyltrimethoxysilane, γ-glycidoxypropyltriethoxysilane, γ-glycidoxypropyltripropoxysilane, γ-glycidoxypropyltributoxysilane, 3,4-epoxycyclohexylmethyltrimethoxysilane, 3,4-epoxycyclohexylmethyltriethoxysilane, β-(3,4-epoxycyclohexyl)ethyltrimethoxysilane, and β-(3,4-epoxycyclohexyl)ethyltriethoxysilane. In particular, among these alkoxysilanes having an epoxy group, γ-glycidoxypropyltriethoxysilane is preferably used from the viewpoints of easy handleability, reactivity, and the like.

In addition, preferable examples of the alkoxysilane having an amino group include aminopropyltrimethoxysilane, aminopropyltriethoxysilane, (β-aminoethyl)-β-amionpropyltrimethoxysilane, (β-aminoethyl)-β-aminopropylmethyldimethoxysilane, and (β-aminoethyl)-γ-aminopropyltrimethoxysilane. Among these alkoxysilanes having an amino group, aminopropyltriethoxysialne is particularly preferable from the viewpoints of easy handleability and the likes.

Regarding these alkoxysilanes, similar to the above-described alkoxysilanes, there is no problem that a part or all of the alkoxy groups may be hydrolyzed in the treatment liquid, or a hydrolyzed product may be converted into a high-molecular-weight compound by a polymerization or condensation reaction. When the alkoxysilane having an epoxy group is mixed with the alkoxysilane having an amino group in the treatment liquid, there is an advantageous effect in that the adhesion of the photocatalytic film with the metal or the lower layer film, and the stability of the organic-inorganic composite resin to a photocatalyst are improved. Regarding the reason for this, the details are not clear. However, the present inventors presume the reason to be that, by adding an epoxy group and an amino group, a strong bond which contributes to the adhesion of the photocatalytic film with the metal or the lower layer film is formed.

In addition, the treatment liquid may optionally further contain an alkoxide containing a metal element other than Si as an additive. In particular, when an alkoxide of one metal selected from Ti, Al, Ta, and Nb is added to the treatment liquid and acetic acid is used as an acid catalyst, the ring-opening rate of an epoxy group increases, and the treatment liquid can be cured at a low temperature within a short period of time. In the metal alkoxides other than alkoxysilane, a part or all of the alkoxy groups may be hydrolyzed.

In addition, the treatment liquid may optionally further contain at least one of, for example, zirconium alkoxide, hydrolysates thereof, and zirconium oxide (zirconia) sols as a compound of zirconium. This component containing zirconium improves the alkali chemical resistance of the treatment liquid containing silica as a major component and the film formed by this treatment liquid. A mechanism with which alkali resistance is improved by adding the above-described components to the treatment liquid is not always clear. However, it is presumed that Si constituting the siloxane bond is substituted with Zr, a network mainly composed of silica and zirconia is formed, and this network is stable to alkali.

Conditions (for example, type, amount (only amount of the treatment liquid after curing), particle size distribution (particle size), and form of particles) of photocatalytic particles in the treatment liquid are the same as those of the photocatalytic particles described in the above-described embodiment. In order to form the sound photocatalytic film, the ratio of the photocatalytic particles to the treatment liquid is preferably 1.0 g/l to 50 g/l. The lower limit of the ratio is preferably greater than or equal to 2.0 g/l, more preferably greater than or equal to 2.5 g/l, and particularly preferably greater than or equal to 5.0 g/l. The upper limit of the ratio is preferably less than or equal to 45 g/l, more preferably less than or equal to 40 g/l, and particularly preferably less than or equal to 30 g/l.

In order to measure a particle size distribution of photocatalytic particles in the photocatalytic film-forming treatment liquid, the dispersed particle size of the photocatalytic particles in the treatment liquid may be measured with a light scattering method using laser light or the like.

When the dispersed particle size of the photocatalytic particles in the treatment liquid immediately before coating is approximately the same as that the dispersed particle size of a photocatalyst which are present in the formed photocatalytic film, this method can be used as the method of measuring the particle size distribution of the photocatalytic particles of the surface-treated metal according to the above-described embodiment. Usually, in the treatment liquid coating process and the baking process, an operation of changing the dispersed particle size of the particles in the treatment liquid is not performed. Therefore, in many cases, the particle size distribution of the photocatalytic particles in the treatment liquid is approximately the same as the particle size distribution of the photocatalytic particles in the photocatalytic film. Furthermore, in this method, the particle size distribution of the dispersoid can be directly measured while maintaining the state of the dispersion system. Therefore, aggregates in the treatment liquid can be measured not as primary particles but as aggregated particles.

(Additives in Photocatalytic Film-Forming Treatment Liquid)

In order to improve the design characteristics, corrosion resistance, wear resistance, catalytic function, and the like of the photocatalytic film, the above-described treatment liquid may further contain a color pigment, a moisture-resistant pigment, a catalyst, a rust preventive pigment, metal powder, a high-frequency loss agent, and an aggregate as additives. Examples of the pigment include the above-described compounds, oxides and composite oxides of Ti, Al and the like and metal powders such as Zn powder and Al powder. Preferable examples of the rust preventive pigment include pigments such as calcium molybdate, calcium phosphomolybdate, and aluminum phosphomolybdate which do not contain environmental pollutants such as chromic acid. In addition, examples of the high-frequency loss agent include Zn—Ni ferrite, and examples of the aggregate include potassium titanate fiber.

In addition, the treatment liquid may optionally contain an acid catalyst. Examples of the acid catalyst include organic acids such as formic acid, maleic acid, and benzoic acid, and inorganic acids such as hydrochloric acid and nitric acid. Particularly, acetic acid is preferably used. By using an acid as a catalyst, alkoxysilane which is used as a raw material is likely in the polymerization state suitable for film formation. In addition, when acetic acid is used as a catalyst, the ring opening of an epoxy group is promoted, and the treatment liquid can be cured at a low temperature within a short period of time.

In addition, as an additive, a leveling effect agent, an antioxidant, an ultraviolet absorber, a stabilizer, a plasticizer, a wax, an addition type ultraviolet stabilizer or the like may be mixed with the treatment liquid. In addition, optionally, the treatment liquid may contain an organic resin such as a fluororesin, a polyester resin, or a urethane resin in a range not departing the heat resistance of the film or in a range in which there is no deterioration by a photocatalyst. As the additive, only one type of additive may be used, or two types of additives may be approximately mixed and used.

(Method of Forming Coating Layer of Surface-Treated Metal)

In the method of producing a surface-treated metal according to the embodiment, in the coating process (S2), the above-described treatment liquid is coated on a surface of a metal which is a substrate or on a surface of a metal which is undercoated. In this process, the treatment liquid can be coated using a dip coating method, a spray coating method, a bar coating method, a roll coating method, or a spin coating method. Next, in the baking process (S3), a surface-treated metal can be obtained by baking the coated treatment liquid and drying and curing the treatment liquid. Depending on the thickness of a photocatalytic film to be formed, the coating process (S2) and the baking process (S3) may be repeated multiple times.

When a two-layer coating including the lower layer film (for example, the coating layers 3b to 3e in FIG. 1A) such as the intermediate layer is formed, the above-described processes (processes corresponding to S2 and S3) are repeated twice. In addition, when a three-layer or multi-layer coating is formed, the above-described processes are repeated three or more times.

Conditions (type, shape, and whether being processed or not) of the metal on which the treatment liquid is coated are the same as the conditions of the metal described in the above-described embodiment. In addition, a surface of the substrate to be coated with the treatment liquid may be a part (for example, a single surface of the sheet) of the substrate or may be the entire surface of the substrate.

In addition, when a plurality of coating layers are formed, a plurality of types of treatment liquid for forming the plurality of coating layers are simultaneously coated on a surface of the substrate, and these treatment liquids are simultaneously dried and baked. In this case, for example, the treatment liquid may be appropriately selected such that two coating layers having different amounts of photocatalytic particles are formed. In this way, when a plurality of types of treatment liquids are simultaneously coated on the surface of the substrate (multilayer simultaneous coating), a method using a multilayer curtain coater or the like is preferably used.

As described above, a coated material having a plurality of coating layers may be formed by coating a plurality of types of treatment liquids on a surface of a substrate containing a metal. For example, a second layer-forming treatment liquid (second treatment liquid) different from the photocatalytic film-forming treatment liquid is used as one of the plurality of types of treatment liquids other than the photocatalytic film-forming treatment, and the second layer-forming treatment liquid may be coated such that a second layer formed between the metal and the photocatalytic film-forming treatment liquid may be in contact with the photocatalytic film-forming treatment liquid. In this case, as mentioned above, the photocatalytic film-forming treatment liquid and the second layer-forming treatment liquid may be selected such that a ratio of a micro-Vickers hardness when the second layer-forming treatment liquid is cured to a micro-Vickers hardness when the photocatalytic film-forming treatment liquid is cured is 0.20 to 0.95. In addition, the photocatalytic film-forming treatment liquid and the second layer-forming treatment liquid may be selected such that a water contact angle when the second layer-forming treatment liquid is cured is in a range obtained by adding 10° to 80° to a water contact angle when the photocatalytic film-forming treatment liquid is cured. Furthermore, the lower layer film containing an organic resin may be formed on a surface of the substrate containing a metal.

In such a case, as the above-described multilayer simultaneous coating method, for example, a method may be adopted in which the lower layer film (one layer or multiple layers) containing an organic resin is formed on the surface of the substrate, next, the second treatment liquid and the first treatment liquid are simultaneously coated on the lower layer film, and the second treatment liquid and the first treatment liquid are simultaneously dried and baked. In addition, for example, a method may be adopted in which at least one coating liquid (for example, liquid containing an organic monomer and an organic polymer) for forming the lower layer coating containing an organic resin, the second treatment liquid, and the first treatment liquid are simultaneously coated on the surface of the substrate, and these liquid are simultaneously dried and baked. With these methods, it is possible to form a multi-layer film (film on which a plurality of layers are laminated) including the lower layer film (one layer or multiple layers) formed on the surface of the substrate, a second layer film (second layer) formed by curing the second treatment liquid on the lower layer film, and an outermost layer film (photocatalytic film) formed by curing the first treatment liquid on the second layer film.

In the baking process (S3), usually, the coating layer is cured by heating. As standard heating conditions, it is preferable that a heating treatment be performed for 1 hour to several seconds in a temperature range from 150° C. to 400° C. When the coating layer is cured at a temperature of 150° C. or higher, the heating time can be reduced, and the productivity can be sufficiently secured. On the other hand, when the coating layer is cured at a temperature of 400° C. or lower, the baking process becomes more economical. In general, when the heat treatment temperature is high, the coating layer can be cured within a short period of time, and when the heat treatment temperature is low, a long period of time of heat treatment is necessary. In addition, when there are no sufficient temperature and time for drying or the heat treatment, the coating layer can be temporarily dried and baked to be cured and optionally can be left to stand at room temperature for 1 day to 5 days. Through these processes, the hardness of the coating layer can be increased as compared to that immediately before coating.

(Introduction of Concave)

Here, examples of "a preferable method" for introducing concave into the coated material (photocatalytic film) will be described. Of course, even when a coated material having concave is formed without using the following methods, as long as such a coated material having concave satisfies the conditions according to the above-described embodiment, the coated material is the target of the surface-treated metal according to the above-described embodiment. In addition, a plurality of a combination method of the following examples may be used. Furthermore, with such a concave introducing method, the surface area (surface area of photocatalytic particles which contribute to contamination resistance) of the outermost layer per unit area of the surface-treated metal (metal) can be effectively increased.

(First Concave Introducing Method)

A first method of effectively introducing concave will be described. When the photocatalytic film is formed, as described above, the hydrolysis and polycondensation of chemical components such as a silane coupling agent, silicon alkoxide, and an alkoxide of a metal other than silicon are used. Therefore, by selecting the types and amounts of a silane coupling agent and alkoxides which are used, concave can be introduced into the film.

In a silane coupling agent and alkoxides, when the number of organic groups which are directly bonded to a metal element such as silicon is small, concave are likely to be introduced into the photocatalytic film. Therefore, a silane coupling agent and alkoxides which have many inorganic components and many functional groups contributing to a siloxane bond may be used. For example, in the case of silicon, in tetramethoxysilane, tetraethoxysilane, and the like, a methoxy group and an ethoxy group bonded to silicon are hydrolyzed to form hydroxyl groups, and a silicon compound having these hydroxyl groups is further polycondensed to form siloxane. Therefore, during the hydrolysis and polycondensation, a large shrinkage occurs, and thus concave are likely to be introduced into the photocatalytic film. In addition, in this case, since the amount of organic components is small, the rigidity of the film after the polycondensation is high. For example, during a heat treatment for forming a film, concave are likely to be introduced into the photocatalytic film. Accordingly, it is preferable that the treatment liquid further contain a composition (for example, hydrolysate) derived from at least one tetraalkoxysilane selected from the group consisting of tetramethoxysilane and tetraethoxysilane.

(Second Concave Introducing Method)

A second method of effectively introducing concave is to appropriately reduce a coating amount of the treatment liquid for forming the film or reduce a concentration of a non-volatile content (solid content) in the treatment liquid. In this case, along with the volatilization of a solvent during the drying process or the baking process after coating, a large shrinkage of the film occurs, and thus concave are likely to be introduced. However, when the concentration of the non-volatile content in the treatment liquid is reduced more than necessary, there is a possibility that the desired film thickness may not be secured. Therefore, it is preferable that the concentration of the non-volatile content in the treatment liquid be controlled to be in a predetermined range. For example, in order to flexibly control the film thickness, it is preferable that this concentration of the non-volatile content be controlled to be 2.5 mass % to 5.0 mass %. In addition, in order to form concave in the photocatalytic film, under general conditions, it is preferable that the concentration of the non-volatile content in the treatment liquid be set to be less than or equal to approximately 5 mass %. However, under conditions for the system in which the above-described tetramethoxysilane and tetraethoxysilane are used, it is preferable that the concentration of the non-volatile content be set to be less than or equal to approximately 10 mass %.

(Third Concave Introducing Method)

A third method of effectively introducing concave is to rapidly cool the film after drying and baking. This method is particularly effective for a hard film having many inorganic components or for a film having a large film thickness. In this method, a sound film is formed first, and then concave are physically introduced into the film. Therefore, a film containing a large amount of photocatalysts, in which the surface area is significantly large and a surface is not covered with a resin and is exposed, can be formed. For example, an average cooling rate in a temperature range from the baking temperature (for example, around 250° C. which is a general baking temperature) to 100° C. is higher than or equal to 100° C./sec, preferably, higher than or equal to 200° C./sec. This average cooling rate can be obtained by, for example, cooling the coating layer in water after baking. An upper limit of the average cooling rate is not particularly limited but, for example, may be 1500° C./sec for convenience of measurement.

EXAMPLES

The invention will be described in more detail using the following examples.

Example 1

110 parts by mass of γ-glycidoxypropyltriethoxysilane (GPTES), 9.0 parts by mass of titanium tetraethoxide (TE), and 192.5 parts by mass of tetraethoxysilane (TEOS) were sufficiently stirred, followed by hydrolysis under acidic conditions using distilled water diluted with ethanol. 44 parts by mass of aminopropyltriethoxysilane (APTES) was added to this solution, followed by hydrolysis using a mixed solution of distilled water and ethanol. As a result, a treatment liquid containing an organic-inorganic complex as a major component was prepared. A sufficient amount of water was used for hydrolysis, and the amount of water was adjusted such that a concentration of an non-volatile content in the treatment liquid (when being dried at 150° C.) was 8 mass %. Anatase-type $TiO_2$ particles (manufactured by Ishihara Sangyo Kaisha, LTD., ST series, average particle size $d_{PAV}$: approximately 10 nm) showing photocatalytic activity, ZnO particles (manufactured by Hakusuitech Co., Ltd., Zincox Super F series, average particle size $d_{PAV}$: approximately 60 nm), and $Nb_2O_5$ particles (laboratory-synthesized product, average particle size $d_{PAV}$: approximately 100 nm) were added to the treatment liquid as level shown in Table 1 to prepare a coating liquid. Furthermore, in this coating liquid, as clearly seen from the mixing ratios of the above-described respective raw materials, a ratio of the particles showing photocatalytic activity to the treatment liquid containing the above-described organic-inorganic complex as a major component was in a range from 2.5 g/l to 50 g/l.

(Steel Sheets for Contamination Resistance Test)

In a contamination resistance test, a steel sheet, which was obtained by treating a surface of a hot-dip galvanized steel sheet with an organic silicate, was used as a substrate. This steel sheet was coated with the above-described coating liquid using a bar coater and was dried and baked at a maximum temperature of 250° C. under temperature rise conditions which the sheet temperature reached the maximum temperature after 50 seconds. Next, the steel sheet in which the coating liquid was baked was rapidly cooled in water. In this way, surface-treated steel sheets (surface-treated metals) which included a photocatalytic film containing photocatalytic particles on a surface thereof were obtained (Nos. 1 to 12). The average cooling rates of the surfaces of the surface-treated steel sheets, that is, the average cooling rates of the photocatalytic films were approximately 1000° C./sec, and a plurality of concave were present in the formed photocatalytic films. These concaves formed a network shape, and the sizes of outermost layer portions surrounded by the concave were different from each other. The properties of the concave are shown in Table 1. All the thicknesses t of the formed films (Nos. 1 to 12 in Table 1) were approximately 2 μm.

In order to obtain the properties ($f_W$ and $r_S$) of the concave in Table 1, the dimensions (the widths W of the concave and the total length $L_t$ of the concave) of the concave present in a 100 μm×100 μm arbitrary area were measured using a scanning electron microscope (SEM). In this measurement, values measured at three different areas are averaged to calculate the widths W of the concave. At the same time, the lengths of all the concave present in the same three areas were measured, and the obtained values were averaged to calculate the total length $L_t$ of the concave. Furthermore, with the same method, the lengths of concave in which "W/t" was satisfied in a range from 0.01 to 1.0 were measured, and the obtained value $L_w$ (the average value of the three areas) was divided by the total length $L_t$ of the concave. As a result, a ratio $f_W$ of the concave in which "W/t" was 0.01 to 10 to all the concave was calculated. In addition, the surface area of the photocatalytic film was measured with a gas absorption method using $N_2$, and the unit area (the area of the surface) of the metal which was substrate was calculated from the size of a sample used in the gas absorption method. In the gas absorption method, the surface area of an exposed portion of a lower layer film which was present below the photocatalytic film was also measured at the same time. Previously, using a sample in which the photocatalytic film was not coated, the surface area of the entire lower layer film was measured using the same gas absorption method, and the surface area of the lower layer film per unit area of the metal was calculated. The surface area of the lower layer film per unit area of the metal, and the surface area of the exposed portion of the lower film calculated by the following coverage were subtracted from the surface area of the surface-treated steel sheet including the photocatalytic film. As a result, the surface area of the photocatalytic film was calculated in anticipation of an increase in surface area by the introduction of the concave. By dividing the obtained surface area of the photocatalytic film by the unit area of the metal, a ratio $r_S$ of the surface area of the photocatalytic film to the surface area of the metal was calculated. In order to obtain the coverage $f_C$ of the photocatalytic film, using the same measurement method as that of the dimensions of the concave, arbitrary three 100 μm×100 μm areas were observed using SEM to perform image processing. As a result, the surface area where the photocatalytic films were not coated was calculated. The coverage f: of the photocatalytic film was calculated from the obtained surface area where the photocatalytic films were not coated, and the surface area of the observed areas. In addition, the ratio of the concave in which "W/t" was 0.01 to 10 was calculated in 0.5% increments in consideration of the measurement precision of the widths W of the concave and the thickness t of the photocatalytic film.

In addition, the following steel sheets were prepared as comparative examples. First, through the same processes (except the concentration of a non-volatile content and the conditions shown in Table 1) as those of Nos. 1 to 12, a treatment liquid having a concentration of a non-volatile content of 20 mass % was prepared, and photocatalytic particles shown in Table 1 were added to the treatment liquid, thereby obtaining a coating liquid. As a substrate of a photocatalytic film, a steel sheet, which was obtained by treating a surface of a hot-dip galvanized steel sheet with an organic silicate, was used. This steel sheet was coated with the above-described coating liquid using a bar coater and was dried and baked at a maximum temperature of 250° C. under temperature rise conditions which the sheet temperature reached the maximum temperature after 50 seconds. Next, the steel sheet in which the coating liquid was baked was rapidly cooled in water. In this way, surface-treated steel sheets which included a photocatalytic film containing photocatalytic particles on a surface thereof were obtained (Nos. 101 to 108). In Nos. 101 to 108, concaves were not observed.

TABLE 1

| | Photocatalytic Particles | | | Properties of Concave | | | |
|---|---|---|---|---|---|---|---|
| No. | Type* | $d_{PAV}$ (nm) | Content (vol. %) | $f_w$ (%) | $r_s$ (—) | $f_c$ (%) | Note |
| 1 | TiO$_2$ | 10 | 0.5 | 99.5 | 7.6 | 81 | Example |
| 2 | TiO$_2$ | 10 | 1.0 | 99.5 | 8.2 | 80 | Example |
| 3 | TiO$_2$ | 10 | 2.0 | 99.5 | 7.5 | 83 | Example |
| 4 | TiO$_2$ | 10 | 5.0 | 99.5 | 7.0 | 85 | Example |
| 5 | TiO$_2$ | 10 | 10.0 | 99.5 | 7.1 | 86 | Example |
| 6 | TiO$_2$ | 10 | 20.0 | 99.5 | 7.2 | 86 | Example |
| 7 | TiO$_2$ | 10 | 40.0 | 99.5 | 6.8 | 88 | Example |
| 8 | TiO$_2$ | 10 | 50.0 | 99.5 | 6.6 | 88 | Example |
| 9 | ZnO | 50 | 10.0 | 99.5 | 5.5 | 88 | Example |
| 10 | ZnO | 50 | 20.0 | 99.5 | 5.1 | 89 | Example |
| 11 | Nb$_2$O$_5$ | 100 | 10.0 | 99.5 | 4.8 | 89 | Example |
| 12 | Nb$_2$O$_5$ | 100 | 20.0 | 99.5 | 3.5 | 91 | Example |
| 101 | TiO$_2$ | 100 | 1.0 | No concave | | 100 | Comparative Example |
| 102 | TiO$_2$ | 100 | 2.0 | No concave | | 100 | Comparative Example |
| 103 | TiO$_2$ | 100 | 5.0 | No concave | | 100 | Comparative Example |
| 104 | TiO$_2$ | 100 | 10.0 | No concave | | 100 | Comparative Example |
| 105 | TiO$_2$ | 100 | 20.0 | No concave | | 100 | Comparative Example |
| 106 | TiO$_2$ | 100 | 40.0 | No concave | | 100 | Comparative Example |
| 107 | ZnO$_2$ | 50 | 10.0 | No concave | | 100 | Comparative Example |
| 108 | Nb$_2$O$_5$ | 100 | 10.0 | No concave | | 100 | Comparative Example |

A photocatalytic effect of the surface-treated steel sheet was verified with the following methods.

(i) First, in order to evaluate contamination resistance, an exposure test of the surface-treated steel sheet was performed outdoors. Contamination by raindrops and contamination by dust and the like after 2 weeks as an index immediately after usage starts, and contamination by raindrops and contamination by dust and the like after 6 months as an index for a long period of time, were evaluated by visual inspection.

(ii) Particularly, as a method of easily evaluating contamination resistance within a short period of time, pollutants (a black marker and a red marker) were coated on the surface of the surface-treated steel sheet, and the irradiation time of ultraviolet rays and the removal state of the pollutants were measured. The removal state of the pollutants was evaluated by measuring the color of the surface of the surface-treated steel sheet using a color-difference meter.

(iii) The state of deterioration (damage) of the photocatalytic film was evaluated by measuring the color and gloss of the surface of the surface-treated steel sheet before and after the outdoor exposure test using a color-difference meter and a glossmeter.

In addition, when a polyester film was formed immediately below the photocatalytic film, the state of deterioration of the polyester film was also evaluated by observing the state of an interface (cut surface) between the photocatalytic film and the polyester film.

The state of deterioration (damage) of the photocatalytic film and the state of deterioration of the polyester film were evaluated as the resistance to deterioration of the film.

For the evaluation of the test results, a part or all of 5 grades of A, B, C, D, and E were used. Furthermore in order to clearly distinguish the grades from each other, 5 grades of A to E were used for the state of deterioration of the film and the comprehensive evaluation. Evaluation criteria for the respective items in Table 3 were shown in Table 2.

TABLE 2

| Grades | Contamination Resistance to Raindrop Contamination and Dust Pollution (After 2 Weeks) | Contamination Resistance to Raindrop Contamination and Dust Pollution (After 6 Months) | Contamination Resistance to Markers | Resistance to Deterioration of Film |
|---|---|---|---|---|
| A | — | — | — | No Deterioration after Exposure during 6 months (Gloss Retention: 95% or Higher) |

TABLE 2-continued

| Grades | Contamination Resistance to Raindrop Contamination and Dust Pollution (After 2 Weeks) | Contamination Resistance to Raindrop Contamination and Dust Pollution (After 6 Months) | Contamination Resistance to Markers | Resistance to Deterioration of Film |
|---|---|---|---|---|
| B | Contaminants were Unremarkable | Contaminants were Unremarkable | Fading was Clearly Observed after 0.5 hours from Ultraviolet Irradiation | No Deterioration after Exposure during 6 months (Gloss Retention: 90% or Higher) |
| C | Contaminants were Slightly Attached | Contaminants were Slightly Attached | Fading was Observed after 1 hour from Ultraviolet Irradiation | Small Deterioration after Exposure during 6 months (Gloss Retention: 60% to Lower Than 90%) |
| D | Attachment of Contaminants Was Remarkable | Attachment of Contaminants Was Remarkable | Fading was Slightly Observed after 2 hours from Ultraviolet Irradiation | Small Deterioration after Exposure during 6 months (Gloss Retention: Lower Than 60%) |
| E | — | — | No Fading was Observed after 2 hours from Ultraviolet Irradiation | Small Deterioration after Exposure during 3 months (Gloss Retention: Lower Than 50%) |

The results were shown in Table 3. Since the concaves were present in the film, the surface-treated steel sheets of Nos. 1 to 12 had superior contamination resistance to the contamination in the initial stage 2 weeks after the outdoor exposure test and the marker contamination. In addition, the surface-treated steel sheets also had superior contamination resistance to the contamination 6 months after the outdoor exposure test (after a certain period of time). Furthermore, in the surface-treated steel sheets of Nos. 1 to 12, no deterioration of the photocatalytic film was observed 6 months after the outdoor exposure test, and the photocatalytic film was in the extremely favorable state. It was found from these results that, in the surface-treated steel sheets of Nos. 1 to 12, the photocatalytic film was difficult to deteriorate and contamination resistance was superior for a long period of time from the initial stage. On the other hand, in the surface-treated steel sheets of Nos. 101 to 108, since concaves were not present in the film, a long period of time was required for decomposing the markers which were the pollutants and contamination resistance to the markers were low. In these surface-treated steel sheets, no deterioration of the photocatalytic film was observed, and the photocatalytic film was in the extremely favorable state.

It was found from the above results that, in the surface-treated steel sheet of Nos. 1 to 12, contamination resistance was superior from the initial stage and the contamination resistance was maintained for a long period of time, whereas in the surface-treated steel sheets of Nos. 101 to 108, there were problems regarding the contamination resistance of the initial stage.

In addition, when measured using both SEM and TEM, the particle size distribution of a photocatalytic material in the photocatalytic film of the outermost layer of the surface-treated steel sheet was almost the same as the particle size distribution measured in the coating liquid.

TABLE 3

| No. | Contamination Resistance (After 2 Weeks) | | Contamination Resistance (After 6 Months) | | Contamination Resistance to Markers | Resistance to Deterioration of Film | Comprehensive Evaluation | Note |
|---|---|---|---|---|---|---|---|---|
| | Raindrop Contamination | Dust Pollution | Raindrop Contamination | Dust Pollution | | | | |
| 1 | C | B | C | B | B | A | C | Example |
| 2 | C | B | B | B | B | A | B | Example |
| 3 | B | B | B | B | B | A | A | Example |
| 4 | B | B | B | B | B | A | A | Example |
| 5 | B | B | B | B | B | A | A | Example |
| 6 | B | B | B | B | B | A | A | Example |
| 7 | B | B | B | B | B | A | A | Example |
| 8 | B | B | B | B | B | B | B | Example |
| 9 | B | B | B | B | B | A | A | Example |
| 10 | B | B | B | B | B | A | A | Example |
| 11 | C | B | B | B | B | A | C | Example |
| 12 | B | B | B | B | B | A | A | Example |
| 101 | C | C | C | B | E | A | E | Comparative Example |

TABLE 3-continued

| | Contamination Resistance (After 2 Weeks) | | Contamination Resistance (After 6 Months) | | Contamination Resistance to | | | |
|---|---|---|---|---|---|---|---|---|
| No. | Raindrop Contamination | Dust Pollution | Raindrop Contamination | Dust Pollution | Resistance to Markers | Deterioration of Film | Comprehensive Evaluation | Note |
| 102 | C | C | B | B | D | A | D | Comparative Example |
| 103 | C | B | B | B | D | A | D | Comparative Example |
| 104 | C | B | B | B | D | A | D | Comparative Example |
| 105 | C | B | B | B | D | A | D | Comparative Example |
| 106 | C | B | B | B | D | A | D | Comparative Example |
| 107 | C | B | B | B | D | A | D | Comparative Example |
| 108 | C | B | B | B | E | A | D | Comparative Example |

Example 2

100 parts by mass of γ-glycidoxypropyltriethoxysilane (GPTES), 8.2 parts by mass of titanium tetraethoxide (TE), 144 parts by mass of phenyltriethoxysilane (PhTES), and 36 parts by mass of dimethyldicthoxysilane (DMDES) were sufficiently stirred, followed by hydrolysis under acidic conditions using distilled water diluted with ethanol. 40 parts by mass of aminopropyltriethoxysilane (APTES) was added to this solution, further followed by hydrolysis using a mixed solution of distilled water and ethanol. As a result, a treatment liquid containing an organic-inorganic complex as a major component was prepared. A sufficient amount of water was used for hydrolysis. Then, in order to change the properties of the concave when the photocatalytic film was formed, the amount of water was adjusted such that a concentration of an non-volatile content in the treatment liquid when being dried at 150° C. was 15 mass %. Anatase-type $TiO_2$ particles (average particle size $d_{PAV}$: approximately 10 nm) showing photocatalytic activity were added to the treatment liquid such that a volume ratio thereof to the total volume of the photocatalytic film was 10%, to prepare a coating liquid. Furthermore, in this coating liquid, as clearly seen from the mixing ratios of the above-described respective raw materials, a ratio of the particles showing photocatalytic activity to the treatment liquid containing the above-described organic-inorganic complex as a major component was in a range from 2.5 g/l to 50 g/l.

In a contamination resistance test, a precoated steel sheet, which was obtained by coating the outermost surface of a galvanized steel sheet with a polyester film having a melamine crosslinking agent at a thickness of about 15 μm, was used as a substrate. This precoated steel sheet was coated with the above-described coating liquid using a bar coater and was dried and baked at a maximum temperature of 250° C. under temperature rise conditions which the sheet temperature reached the maximum temperature after 50 seconds. Next, the precoated steel sheet in which the coating liquid was baked was rapidly cooled in water. In this way, surface-treated steel sheets were obtained. The average cooling rates of the surfaces of the surface-treated steel sheets, that is, the average cooling rates of the photocatalytic films were 1000° C./sec. All the thicknessest of the formed films was approximately 5 μm (Nos. 13 to 20 in Table 4). A plurality of concave was present in the formed photocatalytic films on the surfaces of the obtained steel sheets. Due to these concaves, the coverage values and surface areas of the films were different from each other. These concaves formed a network shape, and the sizes of outermost layer portions surrounded by the concave were different from each other. Methods of measuring the properties (above-described $f_W$ and $r_S$) of the concave, the coverage $f_C$ of the photocatalytic film, and the like were the same as those of Example 1. In addition, in Table 4, a ratio $r_f$ of the total length of flat areas of the outermost layer to the length of the entire surface of the outermost layer which was obtained by observing a cross-section of the outermost layer using SEM is also shown.

In addition, as a comparative example, a treatment liquid having a concentration of a non-volatile content of 20% was prepared through the same processes as above. The same $TiO_2$ particles (average particle size $d_{PAV}$: approximately 10 nm) showing photocatalytic activity as those of Nos. 13 to 20 were added to the treatment liquid such that a volume ratio of the $TiO_2$ particles to the total volume of the photocatalytic film was 10%, to prepare a coating liquid. The obtained coating liquid was coated with the same precoated steel sheet as above and was dried and baked. Next, the precoated steel sheet in which the coating liquid was baked was cooled by blowing mist thereto. In this way, a surface-treated steel sheet which included a photocatalytic film not having concave and having the same thickness as that of Nos. 13 to 20 was obtained (No. 109). In No. 109, the average cooling rate of the photocatalytic film was approximately 50° C./sec.

TABLE 4

| | Photocatalytic Particles | | Properties of Concave | | | | |
|---|---|---|---|---|---|---|---|
| No. | Type* | $d_{PAV}$ (nm) | Content (vol. %) | $f_w$ (%) | $r_s$ (—) | $f_c$ (%) | $r_f$ (%) | Note |
| 13 | $TiO_2$ | 10 | 10.0 | 99.5 | 12.5 | 98 | 95 | Example |
| 14 | $TiO_2$ | 10 | 10.0 | 99.5 | 13.2 | 95 | 90 | Example |
| 15 | $TiO_2$ | 10 | 10.0 | 99.5 | 20.5 | 90 | 90 | Example |
| 16 | $TiO_2$ | 10 | 10.0 | 99.5 | 16.3 | 85 | 85 | Example |
| 17 | $TiO_2$ | 10 | 10.0 | 99.0 | 15.5 | 80 | 80 | Example |
| 18 | $TiO_2$ | 10 | 10.0 | 98.5 | 11.0 | 70 | 75 | Example |
| 19 | $TiO_2$ | 10 | 10.0 | 97.5 | 8.4 | 60 | 75 | Example |
| 20 | $TiO_2$ | 10 | 10.0 | 96.0 | 2.5 | 50 | 70 | Example |
| 109 | $TiO_2$ | 10 | 10.0 | No concave | | 100 | 90 | Comparative Example |

*$TiO_2$ represents an anatase-type $TiO_2$

Similar to Example 1, a photocatalytic effect of the surface-treated steel sheet was verified by (i) the evaluation of raindrop contamination and dust contamination after 2 weeks and after 6 months in the outdoor exposure test, (ii) the evaluation of the removal amount of marker contamination, and (iii) the evaluation of the deterioration amount of the coating film. Similar to Example 1, for the evaluation of the test results, a part or all (the resistance to deterioration of the film and the comprehensive evaluation) of 5 grades of A to E were used to evaluate the respective items regarding the contamination resistance of the film and the resistance to deterioration. Evaluation criteria were as shown above in Table 2.

The results were shown in Table 5. Since the concaves were present in the film, the surface-treated steel sheets of Nos. 13 to 20 had superior contamination resistance to the contamination in the initial stage 2 weeks after the outdoor exposure test and the marker contamination. In addition, the surface-treated steel sheets also had superior contamination resistance to the contamination 6 months after the outdoor exposure test (after a certain period of time). Furthermore, in the surface-treated steel sheets of Nos. 13 to 20, no deterioration of the photocatalytic film was observed 6 months after the outdoor exposure test, and the photocatalytic film was in the extremely favorable state. It was found from the results of Nos. 13 to 20 that, when the coverage of the photocatalytic film was less than 98%, contamination resistance to the raindrop contamination in the initial stage and the marker contamination could be improved. In addition, it was found from the results of Nos. 13 to 20 that, when the coverage of the photocatalytic film was greater than 50%, contamination resistance to the raindrop contamination in the initial stage, the marker contamination, and the raindrop contamination and dust contamination after 6 months could be improved. It was found from these results that, in the surface-treated steel sheets of Nos. 13 to 20, the photocatalytic film was difficult to deteriorate and contamination resistance was superior for a long period of time from the initial stage.

On the other hand, in the surface-treated steel sheet of No. 109, since concaves were not present in the film, a long period of time was required for decomposing the markers which were the pollutants and contamination resistance to the markers were low. In No. 109, no deterioration of the photocatalytic film was observed, and the photocatalytic film was in the extremely favorable state.

It was found from the above results that, in the surface-treated steel sheet of Nos. 13 to 20, contamination resistance was superior substantially from the initial stage and the contamination resistance was maintained for a long period of time, whereas in the surface-treated steel sheet of No. 109, there were problems regarding the contamination resistance of the initial stage.

In addition, when measured using both SEM and TEM, the particle size distribution of a photocatalytic material in the photocatalytic film of the outermost layer of the surface-treated steel sheet was almost the same as the particle size distribution measured in the coating liquid.

TABLE 5

| No. | Contamination Resistance (After 2 Weeks) | | Contamination Resistance (After 6 Months) | | Contamination Resistance to Markers | Resistance to Deterioration of Film | Comprehensive Evaluation | Note |
|---|---|---|---|---|---|---|---|---|
| | Raindrop Contamination | Dust Pollution | Raindrop Contamination | Dust Pollution | | | | |
| 13 | C | B | B | B | C | A | B | Example |
| 14 | B | B | B | B | B | A | A | Example |
| 15 | B | B | B | B | B | A | A | Example |
| 16 | B | B | B | B | B | A | A | Example |
| 17 | B | B | B | B | B | A | A | Example |
| 18 | B | B | B | B | B | A | A | Example |
| 19 | B | B | B | B | B | A | A | Example |
| 20 | C | B | C | C | C | A | C | Example |
| 109 | C | B | B | B | D | A | D | Comparative Example |

Example 3

A first treatment liquid was prepared with the following method. 117 parts by mass of γ-glycidoxypropyltriethoxysilane (GPTES), 9.6 parts by mass of titanium tetraethoxide (TE), 67 parts by mass of phenyltriethoxysilane (PhTES), and 146 parts by mass of tetraethoxysilane (TEOS) were sufficiently stirred, followed by hydrolysis under acidic conditions using distilled water diluted with ethanol. 46 parts by mass of aminopropyltriethoxysilane (APTES) was added to this solution, further followed by hydrolysis using a mixed solution of distilled water and ethanol. As a result, a treatment liquid containing an organic-inorganic complex as a major component was prepared. A sufficient amount of water was used for hydrolysis, and the amount of water was adjusted such that a concentration of an non-volatile content in the treatment liquid when being dried at 150° C. was 20 mass %. Anatase-type $TiO_2$ particles (average particle size $d_{PAV}$: approximately 10 nm) showing photocatalytic activity were added to the treatment liquid such that a volume ratio of the $TiO_2$ particles to the total volume of the photocatalytic film was 20%, to prepare the first treatment liquid. In addition, in this first treatment liquid, as clearly seen from the mixing ratios of the above-described respective raw materials, a ratio of the particles showing photocatalytic activity to the treatment liquid containing the above-described organic-inorganic complex as a major component was in a range from 2.5 g/l to 50 g/l.

A second treatment liquid was prepared with the following method. 100 parts by mass of γ-glycidoxypropyltriethoxysilane (GPTES), 8.2 parts by mass of titanium tetraethoxide (TE), 144 parts by mass of phenyltriethoxysilane (PhTES), and 71 parts by mass of dimethyldiethoxysilane (DMDES) were sufficiently stirred, followed by hydrolysis under acidic conditions using distilled water diluted with ethanol. 40 parts by mass of aminopropyltriethoxysilane (APTES) was added to this solution, further followed by hydrolysis using a mixed solution of distilled water and ethanol. As a result, a treatment liquid containing an organic-inorganic complex as a major component was prepared. A sufficient amount of water was used for hydrolysis, and the amount of water was adjusted such that a concentration of an non-volatile content in the treatment liquid when being dried at 150° C. was 15 mass %. Anatase-type $TiO_2$ particles (average particle size $d_{P4V}$: approximately 10 nm) showing photocatalytic activity were added to the treatment liquid such that a volume ratio of the $TiO_2$ particles to the total volume of the photocatalytic film was 2%, to prepare the second treatment liquid.

In a contamination resistance test, a precoated steel sheet, which was obtained by coating the outermost surface of a galvanized steel sheet with a polyester film having a melamine crosslinking agent at a thickness of about 15 μm, was used as a substrate. This precoated steel sheet was coated with the above-described second coating liquid using a bar coater and was dried and baked at a maximum temperature of 210° C. under temperature rise conditions which the sheet temperature reached the maximum temperature after 50 seconds. The precoated steel sheet was allowed to cool naturally, and a second layer was formed. The thickness of the second layer was about 3 μm, and concaves were not observed on the surface of the second layer. The surface on which the second layer was formed was further coated with the first treatment liquid using a bar coater and was dried and baked at a maximum temperature of 250° C. under temperature rise conditions which the sheet temperature reached the maximum temperature after 50 seconds. Next, the precoated steel sheet in which the respective treatment liquids were baked was cooled at various average cooling rates under various conditions from rapid cooling in water to slow cooling by the blowing of mist containing a large amount of water. In this way, surface-treated steel sheets were prepared. The average cooling rate was changed in a range from 1000° C./sec (No. 21), which was the highest rate, to 250° C./sec (No. 25). All the thicknesses t of the formed films was approximately 10 μm (Nos. 21 to 25 in Table 6). A plurality of concave having different widths was introduced into the obtained steel sheets. Methods of measuring the properties (above-described $f_W$ and $r_S$) of the concave, the coverage $f_C$ of the photocatalytic film, and the like were the same as those of Example 1 (Nos. 21 to 25 in Table 6). These concaves formed a network shape, and the sizes of outermost layer portions surrounded by the concave were different from each other. After the outermost layer was formed, concaves were not observed in the second layer.

In addition, as a comparative example, the first treatment liquid and the second treatment liquid to which photocatalytic particles were added with the same mixing ratios as those of Nos. 21 to 25 were prepared through the same processes as those of Nos. 21 to 25. The obtained two types of treatment liquids were coated on the same precoated steel sheet as that of Nos. 21 to 25 and was dried and baked. In this way a surface-treated steel sheet was prepared (No. 110). In, No. 110, similar to No. 109, the surface-treated steel sheet was cooled by blowing mist thereto. In this way, a surface-treated steel sheet which included a photocatalytic film not having concave and having the same thickness as that of Nos. 21 to 25 was obtained (No. 110).

TABLE 6

| | Photocatalytic Particles in Primary Treatment Liquid | | Properties of Concave | | | | | |
|---|---|---|---|---|---|---|---|---|
| No. | Type* | $d_{P4V}$ (nm) | Content (vol. %) | $f_W$ (%) | $r_S$ (—) | $f_C$ (%) | H2/H1 (—) | θ2-θ1 (°) | Note |
| 21 | $TiO_2$ | 10 | 20 | 99.5 | 17.5 | 92 | 0.75 | +15 | Example |
| 22 | $TiO_2$ | 10 | 20 | 99 | 18.1 | 93 | 0.75 | +15 | Example |
| 23 | $TiO_2$ | 10 | 20 | 98.5 | 16.4 | 92 | 0.75 | +20 | Example |
| 24 | $TiO_2$ | 10 | 20 | 95.6 | 11.9 | 89 | 0.7 | +20 | Example |
| 25 | $TiO_2$ | 10 | 20 | 90.4 | 8.3 | 87 | 0.7 | +20 | Example |
| 110 | $TiO_2$ | 10 | 20 | No Concave | | 100 | 0.7 | +30 | Comparative Example |

*$TiO_2$ represents an anatase-type $TiO_2$

Similar to Example 1, a photocatalytic effect of the surface-treated steel sheet was verified by the above-described items (i) to (iii). In addition, the micro-Vickers hardnesses and water contact angles of the outermost layer and the second layer were measured using the following methods.

In order to obtain a measurement surface for measuring the micro-Vickers hardnesses, a cross-section of the surface-treated steel sheet on which the outermost layer and the second layer were formed was grinded and was finally finished with a 1 μm diamond paste to form a smooth surface. The hardnesses were measured at a load of 25 gf. The water contact angle of the outermost layer of the surface-treated steel sheet was measured using a sessile drop method after being irradiated with ultraviolet rays for 8 hours. The water contact angle of the second layer was measured after removing the outermost layer of the surface-treated steel sheet by dissolving it in 20% aqueous NaOH solution to expose the second layer and irradiating the second layer with ultraviolet rays for 8 hours.

Similar to Example 1, for the evaluation of the test results, a part or all (the resistance to deterioration of the film and the comprehensive evaluation) of 5 grades of A to E were used to evaluate the respective items regarding the contamination resistance of the film and the resistance to deterioration. Evaluation criteria were as shown above in Table 2. The micro-Vickers hardnesses were represented by a ratio (H2/H1) of a measured value H2 of the second layer to a measured value H1 of the outermost layer. The water contact angle was represented by a value (θ2−θ1) of a measured value θ2 of the second layer relative to a measured value θ1 of the outermost layer.

The results were shown in Table 7. Since the concaves were present in the film, the surface-treated steel sheets of Nos. 21 to 25 had superior contamination resistance to the contamination in the initial stage 2 weeks after the outdoor exposure test and the marker contamination. In addition, the surface-treated steel sheets also had superior contamination resistance to the contamination 6 months after the outdoor exposure test (after a certain period of time). Furthermore, in the surface-treated steel sheets of Nos. 21 to 25, no deterioration of the photocatalytic film was observed 6 months after the outdoor exposure test, and the photocatalytic film was in the extremely favorable state. It was found from the results of Nos. 21 to 25 that the contamination resistance (for example, contamination resistance to raindrop contamination and marker contamination) in the initial stage could be further improved when the total of the lengths of concave in which the ratio "W/t" of the width W of the concave portion to the thickness t of the concave portion was in a range of 0.01 to 10 were greater than 90.4%, particularly, greater than 95.6% of the total length of all the concaves. In addition, the ratio (H2/H1) of the micro-Vickers hardness H2 of the second layer to the micro-Vickers hardness H1 of the outermost layer was in a range from 0.7 to 0.75, and the water contact angle θ2 of the second layer was greater than the water contact angle θ1 of the outermost layer by 15° to 20°. It was found from these results that, in the surface-treated steel sheets of Nos. 21 to 25, the photocatalytic film was difficult to deteriorate and contamination resistance was superior for a long period of time from the initial stage.

On the other hand, in the surface-treated steel sheet of No. 110, since concaves were not present in the film, a long period of time was required for decomposing the markers which were the pollutants and contamination resistance to the markers were low. In No. 110, no deterioration of the photocatalytic film was observed, and the photocatalytic film was in the extremely favorable state.

It was found from the above results that, in the surface-treated steel sheet of Nos. 21 to 25, contamination resistance was superior substantially from the initial stage and the contamination resistance was maintained for a long period of time, whereas in the surface-treated steel sheet of No. 110, there were problems regarding the contamination resistance of the initial stage.

In addition, when measured using both SEM and TEM, the particle size distribution of a photocatalytic material in the photocatalytic film of the outermost layer of the surface-treated steel sheet was almost the same as the particle size distribution measured in the coating liquid.

added to the treatment liquid as level shown in Table 8 to prepare a coating liquid (Nos. 26 to 30).

In addition, 35 parts by mass of γ-glycidoxypropyltriethoxysilane (GPTES), 8.2 parts by mass of titanium tetraethoxide (TE), 87.3 parts by mass of tetraethoxysilane (TEOS), and 63.8 parts by mass of tetramethoxysilane (TMOS) were sufficiently stirred, followed by hydrolysis under acidic conditions using distilled water diluted with ethanol. 39.7 parts by mass of aminopropyltriethoxysilane (APTES) was added to this solution, further followed by hydrolysis using a mixed solution of distilled water and ethanol. As a result, a treatment liquid containing an organic-inorganic complex as a major component was prepared. A sufficient amount of water was used for hydrolysis, and the amount of water was adjusted such that a concentration of an non-volatile content in the treatment liquid (when being dried at 150° C.) was 12.5 mass %. Anatase-type $TiO_2$ particles (average particle size $d_{PAV}$: approximately 10 nm) showing photocatalytic activity were added to the treatment liquid as level shown in Table 8 to prepare a coating liquid (Nos. 31 to 35).

Furthermore, in this coating liquid, as clearly seen from the mixing ratios of the above-described respective raw materials, a ratio of the particles showing photocatalytic activity to the treatment liquid containing the above-described organic-inorganic complex as a major component was in a range from 2.5 g/l to 50 g/l.

In a contamination resistance test, a precoated steel sheet having a thickness of 0.35 mm, which was obtained by coating the outermost surface of a zinc-aluminum alloy coated steel sheet with a polyester film having a melamine crosslinking agent at a thickness of about 15 μm, was used as a substrate. This precoated steel sheet was coated with the above-described coating liquid using a bar coater and was dried and baked at a maximum temperature of 250° C. under tempera-

TABLE 7

| No. | Contamination Resistance (After 2 Weeks) | | Contamination Resistance (After 6 Months) | | Contamination Resistance to Markers | Resistance to Deterioration of Film | Comprehensive Evaluation | Note |
| --- | --- | --- | --- | --- | --- | --- | --- | --- |
| | Raindrop Contamination | Dust Pollution | Raindrop Contamination | Dust Pollution | | | | |
| 21 | B | B | B | B | B | A | A | Example |
| 22 | B | B | B | B | B | A | A | Example |
| 23 | B | B | B | B | B | A | A | Example |
| 24 | B | B | B | B | C | A | B | Example |
| 25 | C | C | B | B | C | A | C | Example |
| 110 | C | B | B | B | D | A | D | Comparative Example |

Example 4

25 parts by mass of γ-glycidoxypropyltriethoxysilane (GPTES), 8.2 parts by mass of titanium tetraethoxide (TE), and 174.6 parts by mass of tetraethoxysilane (TEOS) were sufficiently stirred, followed by hydrolysis under acidic conditions using distilled water diluted with ethanol. 39.7 parts by mass of aminopropyltriethoxysilane (APTES) was added to this solution, further followed by hydrolysis using a mixed solution of distilled water and ethanol. As a result, a treatment liquid containing an organic-inorganic complex as a major component was prepared. A sufficient amount of water was used for hydrolysis, and the amount of water was adjusted such that a concentration of an non-volatile content in the treatment liquid (when being dried at 150° C.) was 12.5 mass %. Anatase-type $TiO_2$ particles (average particle size $d_{PAV}$: approximately 10 nm) showing photocatalytic activity were ture rise conditions which the sheet temperature reached the maximum temperature after 50 seconds. In this way, surface-treated steel sheets including a photocatalytic film on the outermost layer were obtained. A plurality of concave was present in the formed photocatalytic films. The properties of the concave were also shown in Table 8. These concaves formed a network shape, and the sizes of outermost layer portions surrounded by the concave were different from each other. The thicknesses t of the formed films were approximately 3 μm in Nos. 26 to 30 and were approximately 3.5 μm in Nos. 31 to 35.

Concaves were present in the photocatalytic films which were the outermost layers of the surface-treated steel sheets. Methods of measuring the properties (above-described $f_W$ and $r_S$) of the concave, the coverage $f_C$ of the photocatalytic film, and the like were the same as those of Example 1.

TABLE 8

| No. | Photocatalytic Particles Type* | $d_{PAV}$ (nm) | Content (vol. %) | Properties of Concave $f_w$ (%) | $r_s$ (—) | $f_c$ (%) | Note |
|---|---|---|---|---|---|---|---|
| 26 | TiO$_2$ | 10 | 1.0 | 99.5 | 8.4 | 74 | Example |
| 27 | TiO$_2$ | 10 | 2.0 | 99.5 | 8.2 | 75 | Example |
| 28 | TiO$_2$ | 10 | 5.0 | 99.5 | 8.1 | 77 | Example |
| 29 | TiO$_2$ | 10 | 10.0 | 99.5 | 7.8 | 80 | Example |
| 30 | TiO$_2$ | 10 | 20.0 | 99.5 | 7.6 | 81 | Example |
| 31 | TiO$_2$ | 10 | 1.0 | 99.5 | 8.6 | 72 | Example |
| 32 | TiO$_2$ | 10 | 2.0 | 99.5 | 8.5 | 72 | Example |
| 33 | TiO$_2$ | 10 | 5.0 | 99.5 | 8.4 | 74 | Example |
| 34 | TiO$_2$ | 10 | 10.0 | 99.5 | 8.3 | 74 | Example |
| 35 | TiO$_2$ | 10 | 20.0 | 99.5 | 8.3 | 75 | Example |

*TiO$_2$ represents an anatase-type TiO$_2$

Similar to Examples 1 to 3, a photocatalytic effect of the surface-treated steel sheet was verified by the above-described items (i) to (iii). Similar to Examples 1 to 3, for the evaluation of the test results, a part or all (the resistance to deterioration of the film and the comprehensive evaluation) of 5 grades of A to E were used to evaluate the respective items regarding the contamination resistance of the film and the resistance to deterioration. Evaluation criteria were as shown above in Table 2.

The results were shown in Table 9. Since the concaves were present in the film, the surface-treated steel sheets of Nos. 26 to 30 and Nos. 31 to 35 had superior contamination resistance to the contamination in the initial stage 2 weeks after the outdoor exposure test and the marker contamination. In addition, the surface-treated steel sheets also had superior contamination resistance to the contamination 6 months after the outdoor exposure test (after a certain period of time). Furthermore, in the surface-treated steel sheets of Nos. 26 to 30 and Nos. 31 to 35, no deterioration of the photocatalytic film was observed 6 months after the outdoor exposure test, and the photocatalytic film was in the extremely favorable state.

It was found from these results that, in the surface-treated steel sheets of Nos. 26 to 30 and Nos. 31 to 35, the photocatalytic film was difficult to deteriorate and contamination resistance was superior for a long period of time from the initial stage.

In addition, when measured using both SEM and TEM, the particle size distribution of a photocatalytic material in the photocatalytic film of the outermost layer of the surface-treated steel sheet was almost the same as the particle size distribution measured in the coating liquid.

Example 5

A treatment liquid containing an organic-inorganic complex as a major component was prepared with the same formulation as that of the first treatment liquid of Example 3. The amount of water was adjusted such that a concentration ($C_s$ in Table 10) of an non-volatile content in the treatment liquid was 2.5, 5.0, 7.5, or 10 mass % when being dried at 150° C. Anatase-type TiO$_2$ particles (average particle size: about 10 nm) showing photocatalytic activity were added to the treatment liquid such that a mass ratio thereof to the total mass of the photocatalytic film was 10%, to prepare a coating liquid (Nos. 36 to 39). Furthermore, in this coating liquid, a ratio of the particles showing photocatalytic activity to the treatment liquid containing the above-described organic-inorganic complex as a major component was in a range from 2.5 g/l to 50 g/l.

As a comparative example, a coating liquid having the same composition as that of Nos. 36 to 39 was prepared, except that a concentration of an non-volatile content (other than photocatalytic particles) in the treatment liquid when being dried at 150° C. was 25 mass % (No. 111).

In a contamination resistance test, a steel sheet, which was obtained by treating a surface of a hot-dip galvanized steel sheet having a thickness of 0.4 mm with an organic silicate, was used as a substrate. This steel sheet was coated with the above-described coating liquid using a bar coater and was dried and baked at a maximum temperature of 250° C. under temperature rise conditions which the sheet temperature reached the maximum temperature after 50 seconds. In this way, surface-treated steel sheets including a photocatalytic film on the outermost layer were obtained. The thicknesses t of the formed films were approximately 1 μm to 1.5 μm in Nos. 36 to 39 and approximately 2 μm in No. 111. A plurality of concave was present in the photocatalytic films of Nos. 36 to 39. Methods of measuring the properties (above-described $f_W$ and $r_S$) of the concave, the coverage $f_C$ of the photocatalytic film, and the like were the same as those of Example 1. The results thereof are shown in Table 10. These concaves formed a network shape, and the sizes of outermost layer portions surrounded by the concave were different from each other. No concaves were present in the photocatalytic film of No. 111.

TABLE 10

| No. | $C_S$ (mass %) | Photocatalytic Particles Type* | Content (vol. %) | Properties of Concave $f_W$ (%) | $r_S$ (—) | $f_C$ (%) | Note |
|---|---|---|---|---|---|---|---|
| 36 | 2.5 | TiO$_2$ | 10.0 | 92.0 | 2.7 | 58 | Example |
| 37 | 5.0 | TiO$_2$ | 10.0 | 98.5 | 3.2 | 75 | Example |

TABLE 9

| No. | Contamination Resistance (After 2 Weeks) Raindrop Contamination | Dust Pollution | Contamination Resistance (After 6 Months) Raindrop Contamination | Dust Pollution | Contamination Resistance to Markers | Resistance to Deterioration of Film | Comprehensive Evaluation | Note |
|---|---|---|---|---|---|---|---|---|
| 26 | B | B | B | B | B | A | A | Example |
| 27 | B | B | B | B | B | A | A | Example |
| 28 | B | B | B | B | B | A | A | Example |
| 29 | B | B | B | B | B | A | A | Example |
| 30 | B | B | B | B | B | A | A | Example |
| 31 | B | B | B | B | B | A | A | Example |
| 32 | B | B | B | B | B | A | A | Example |
| 33 | B | B | B | B | B | A | A | Example |
| 34 | B | B | B | B | B | A | A | Example |
| 35 | B | B | B | B | B | A | A | Example |

TABLE 10-continued

| | | Photocatalytic Particles | | Properties of Concave | | | |
|---|---|---|---|---|---|---|---|
| No. | $C_S$ (mass %) | Type* | Content (vol. %) | $f_W$ (%) | $r_S$ (—) | $f_C$ (%) | Note |
| 38 | 7.5 | TiO$_2$ | 10.0 | 99.5 | 3.5 | 84 | Example |
| 39 | 10.0 | TiO$_2$ | 10.0 | 99.5 | 4.9 | 97 | Example |

TABLE 11

| | Contamination Resistance (After 2 Weeks) | | Contamination Resistance (After 6 Months) | | Contamination Resistance to | | | |
|---|---|---|---|---|---|---|---|---|
| No. | Raindrop Contamination | Dust Pollution | Raindrop Contamination | Dust Pollution | Resistance to Markers | Deterioration of Film | Comprehensive Evaluation | Note |
| 36 | C | B | B | B | C | A | B | Example |
| 37 | B | B | B | B | B | A | A | Example |
| 38 | B | B | B | B | B | A | A | Example |
| 39 | B | B | B | B | B | A | A | Example |
| 111 | C | B | B | B | D | A | D | Comparative Example |

TABLE 10-continued

| | | Photocatalytic Particles | | Properties of Concave | | | |
|---|---|---|---|---|---|---|---|
| No. | $C_S$ (mass %) | Type* | Content (vol. %) | $f_W$ (%) | $r_S$ (—) | $f_C$ (%) | Note |
| 111 | 25.0 | TiO$_2$ | 10.0 | No Concave | | 100 | Comparative Example |

*TiO$_2$ represents an anatase-type TiO$_2$

Similar to Examples 1 to 4, a photocatalytic effect of the surface-treated steel sheet was verified by the above-described items (i) to (iii). Similar to Examples 1 to 4, for the evaluation of the test results, a part or all (the resistance to deterioration of the film and the comprehensive evaluation) of 5 grades of A to E were used to evaluate the respective items regarding the contamination resistance of the film and the resistance to deterioration. Evaluation criteria were as shown above in Table 2.

The results were shown in Table 11. Since the concaves were present in the film, the surface-treated steel sheets of Nos. 36 to 39 had superior contamination resistance to the contamination in the initial stage 2 weeks after the outdoor exposure test and the marker contamination. In addition, the surface-treated steel sheets also had superior contamination resistance to the contamination 6 months after the outdoor exposure test (after a certain period of time). Furthermore, in the surface-treated steel sheets of Nos. 36 to 39, no deterioration of the photocatalytic film was observed 6 months after the outdoor exposure test, and the photocatalytic film was in the extremely favorable state. It was found from these results that, in the surface-treated steel sheets of Nos. 36 to 39, the photocatalytic film was difficult to deteriorate and contamination resistance was superior for a long period of time from the initial stage.

On the other hand, in the surface-treated steel sheet of No. 111, since concaves were not present in the film, a long period of time was required for decomposing the markers which were the pollutants and contamination resistance to the markers were low. In No. 111, no deterioration of the photocatalytic film was observed, and the photocatalytic film was in the extremely favorable state.

It was found from the above results that, in the surface-treated steel sheet of Nos. 36 to 39, contamination resistance was superior substantially from the initial stage and the contamination resistance was maintained for a long period of time, whereas in the surface-treated steel sheet of No. 111, there were problems regarding the contamination resistance of the initial stage.

In addition, when measured using both SEM and TEM, the particle size distribution of a photocatalytic material in the photocatalytic film of the outermost layer of the surface-treated steel sheet was almost the same as the particle size distribution measured in the coating liquid.

Example 6

100 parts by mass of γ-glycidoxypropyltriethoxysilane (GPTES), 8.2 parts by mass of titanium tetraethoxide (TE), 144 parts by mass of phenyltriethoxysilane (PhTES), and 87 parts by mass of tetracthoxysilane (TEOS) were sufficiently stirred, followed by hydrolysis under acidic conditions using distilled water diluted with ethanol. 39.7 parts by mass of aminopropyltriethoxysilane (APTES) was added to this solution, further followed by hydrolysis using a mixed solution of distilled water and ethanol. As a result, a treatment liquid containing an organic-inorganic complex as a major component was prepared. A sufficient amount of water was used for hydrolysis, and the amount of water was adjusted such that a concentration of a non-volatile content in the treatment liquid was 15 mass % when being dried at 150° C. TiO$_2$ particles (anatase-type, average primary particle size: about 10 nm) showing photocatalytic activity were added to the treatment liquid, followed by dispersion using a paint shaker. Furthermore, TiO$_2$ sol (anatase-type, average crystallite diameter: 15 nm) was added to the treatment liquid to prepare a coating liquid. When TiO$_2$ particles and TiO$_2$ sol were used in combination, a ratio (mass ratio) of a concentration of each solid content thereof was ½. In addition, in this coating liquid, as clearly seen from the mixing ratios of the above-described respective raw materials, a ratio of the particles showing photocatalytic activity to the treatment liquid containing the above-described organic-inorganic complex as a major component was in a range from 2.5 g/l to 50 g/l.

In a contamination resistance test, a precoated steel sheet, which was obtained by coating the outermost surface of a zinc-aluminum alloy coated steel sheet having a thickness of 0.35 mm with a polyester film having a melamine crosslinking agent at a thickness of about 15 µm, was used as a substrate. This precoated steel sheet was coated with the above-described coating liquid using a bar coater and was dried and baked at a maximum temperature of 250° C. under temperature rise conditions which the sheet temperature reached the maximum temperature after 50 seconds. Next, the precoated steel sheet in which the coating liquid was baked was rapidly cooled in water. In this way, surface-treated steel sheets including a photocatalytic film on the outermost layer were obtained. The average cooling rates of the photocatalytic films of the outermost layers were approximately 1000° C./sec. All the thicknesses t of the formed films were approximately 5 μm (Nos. 40 to 52).

The particle size distribution of a photocatalyst present in the coating liquid was measured with a light scattering method using laser light. The results thereof were shown in Table 12. In Nos. 40 to 48, the particle size distribution had two maximum values (the above-described predetermined maximum values), one maximum value was present in a particle size range of 15 nm to 25 nm, and the other maximum value was present in a particle size range of 685 nm to 795 nm. In addition, a plurality of concave was present in the films, these concaves formed a network shape, and the sizes of outermost layer portions surrounded by the concave were different from each other. Methods of measuring the properties (above-described $f_W$ and $r_S$) of the concave, the coverage $f_C$ of the photocatalytic film, and the like were the same as those of Example 1. The results thereof were shown in Table 12.

TABLE 12

| No. | Photocatalytic Particles | | Photocatalytic Sol | | Maximum Values of Particle Size Distribution (nm) | | Properties of Concave | | $f_C$ (%) | Note |
|---|---|---|---|---|---|---|---|---|---|---|
| | Type *1 | Content (mass %) | Type *1 | Content *2 (mass %) | | | $f_W$ (%) | $r_S$ (—) | | |
| 40 | TiO$_2$ | 0.25 | TiO$_2$ | 0.25 | 15 | 685 | 99.5 | 8 | 75 | Example |
| 41 | TiO$_2$ | 0.5 | TiO$_2$ | 0.5 | 15 | 695 | 99.5 | 8.4 | 77 | Example |
| 42 | TiO$_2$ | 1.25 | TiO$_2$ | 1.25 | 15 | 725 | 99.5 | 7.9 | 80 | Example |
| 43 | TiO$_2$ | 2.5 | TiO$_2$ | 2.5 | 15 | 735 | 99.5 | 7.7 | 80 | Example |
| 44 | TiO$_2$ | 5.0 | TiO$_2$ | 5.0 | 15 | 745 | 99.5 | 7.6 | 82 | Example |
| 45 | TiO$_2$ | 10.0 | TiO$_2$ | 10.0 | 15 | 755 | 99.5 | 7.4 | 83 | Example |
| 46 | TiO$_2$ | 15.0 | TiO$_2$ | 15.0 | 15 | 755 | 99.5 | 7.4 | 85 | Example |
| 47 | TiO$_2$ | 20.0 | TiO$_2$ | 20.0 | 20 | 765 | 99.5 | 7.2 | 86 | Example |
| 48 | TiO$_2$ | 25.0 | TiO$_2$ | 25.0 | 25 | 795 | 99.5 | 7.1 | 86 | Example |
| 49 | TiO$_2$ | 30.0 | None | | 755 | | 99.5 | 7.0 | 81 | Example |
| 50 | TiO$_2$ | 40.0 | None | | 775 | | 99.5 | 6.8 | 82 | Example |
| 51 | None | | TiO$_2$ | 10.0 | 15 | | 99.5 | 7.5 | 78 | Example |
| 52 | None | | TiO$_2$ | 20.0 | 25 | | 99.5 | 7.4 | 78 | Example |

*1 TiO$_2$ represents an anatase-type TiO$_2$
*2 The content of the photocatalytic sol was represented by mass % in terms of solid content.

Similar to Examples 1 to 5, a photocatalytic effect of the surface-treated steel sheet was verified by the above-described items (i) to (iii). Similar to Examples 1 to 5, for the evaluation of the test results, a part or all (the resistance to deterioration of the film and the comprehensive evaluation) of 5 grades of A to E were used to evaluate the respective items regarding the contamination resistance of the film and the resistance to deterioration. Evaluation criteria were as shown above in Table 2.

TABLE 13

| No. | Contamination Resistance (After 2 Weeks) | | Contamination Resistance (After 6 Months) | | Contamination Resistance to Markers | Resistance to Deterioration of Film | Comprehensive Evaluation | Note |
|---|---|---|---|---|---|---|---|---|
| | Raindrop Contamination | Dust Pollution | Raindrop Contamination | Dust Pollution | | | | |
| 40 | B | B | B | B | B | A | A | Example |
| 41 | B | B | B | B | B | A | A | Example |
| 42 | B | B | B | B | B | A | A | Example |
| 43 | B | B | B | B | B | A | A | Example |
| 44 | B | B | B | B | B | A | A | Example |
| 45 | B | B | B | B | B | A | A | Example |
| 46 | B | B | B | B | B | A | A | Example |
| 47 | B | B | B | B | B | A | A | Example |
| 48 | B | B | B | B | B | A | A | Example |
| 49 | C | B | B | B | C | A | B | Example |
| 50 | C | B | B | B | C | A | B | Example |
| 51 | C | C | B | B | C | A | C | Example |
| 52 | C | C | B | B | C | A | C | Example |

The results were shown in Table 13. Since the concaves were present in the photocatalytic film of the outermost layer and the photocatalytic particles in the film had a particle size distribution having two or more maximum values, the surface-treated steel sheets of Nos. 40 to 48 had superior contamination resistance to the contamination in the initial stage 2 weeks after the outdoor exposure test and the marker contamination. In addition, the surface-treated steel sheets also had superior contamination resistance to the contamination 6 months after the outdoor exposure test (after a certain period of time). Furthermore, in the surface-treated steel sheets of Nos. 40 to 48, no deterioration of the photocatalytic film was observed 6 months after the outdoor exposure test, and the photocatalytic film was in the extremely favorable state.

In the surface-treated steel sheets of Nos. 49 to 52, concaves were present in the photocatalyst of the outermost layer, and the photocatalytic particles had a particle size distribution having one maximum value. Therefore, in the surface-treated steel steels of Nos. 49 to 52, the photocatalytic film had sufficient contamination resistance and resistance to deterioration.

In addition, it was found that, due to a difference in particle size distribution, when the surface-treated steel sheets of Nos. 40 to 48 were compared to the surface-treated steel sheets of Nos. 49 to 52, contamination resistance to the contamination 2 weeks after the outdoor exposure test and the marker contamination was further improved.

In addition, when measured using both SEM and TEM, the particle size distribution of a photocatalytic material in the photocatalytic film of the outermost layer of the surface-treated steel sheet was almost the same as the particle size distribution measured in the coating liquid.

It was found from the above results that, in all the surface-treated steel sheets of Nos. 40 to 52, contamination resistance was superior from the initial stage and the contamination resistance was maintained for a long period of time. In particular, in the surface-treated steel sheet of Nos. 40 to 48, concave were present in the photocatalytic film of the outermost layer, the particle size distribution of photocatalytic particles in the film had a plurality of maximum values, one of the maximum values was present in a range of 100 nm or less, and another one of the maximum values was present in 500 nm or less. It was found that such surface-treated steel sheets had particularly superior contamination resistance in the initial stage.

Hereinabove, the preferable examples of the invention have been described. However, the invention is not limited to these examples. Various configuration additions, omissions, substitutions, and other modifications can be made within a range not departing from the concepts of the invention. The invention is not limited to the above descriptions and is only limited to the accompanying claims.

INDUSTRIAL APPLICABILITY

According to the invention, it is possible to provide a surface-treated metal which includes a photocatalytic film having superior resistance to deterioration and can maintain superior contamination resistance for a long period of time from the initial stage immediately after usage starts.

REFERENCE SIGN LIST

1: SURFACE-TREATED METAL
2: METAL
3: COATED MATERIAL
3*a*: OUTERMOST LAYER (PHOTOCATALYTIC FILM)
3*b* to 3*e*: COATING LAYERS
4: CONCAVES
4*a* to 4*k*. 4*m*: CONCAVES
5: PHOTOCATALYTIC DISPERSED PHASE (PARTICLES SHOWING PHOTOCATALYTIC ACTIVITY OR AGGREGATES THEREOF, PHOTOCATALYTIC PARTICLES)
6: MATRIX RESIN (ORGANIC-INORGANIC COMPOSITE RESIN)
41: BOTTOM OF CONCAVE
42: SIDE SURFACE OF CONCAVE

The invention claimed is:

1. A surface-treated metal comprising:
a metal; and
a coated material that is formed on a surface of the metal,
wherein an outermost layer of the coated material is a photocatalytic film that contains particles showing a photocatalytic activity and an organic-inorganic composite resin,
the coated material has a second layer in contact with the outermost layer between the outermost layer and the metal,
a volume ratio of the particles showing the photocatalytic activity to the photocatalytic film is in a range from 0.5 vol % to 50 vol %,
the organic-inorganic composite resin contains a siloxane bond and at least one group selected from the group consisting of an aryl group, a carboxyl group, an amino group, a hydroxyl group, and an alkyl group having 1 to 12 carbon atoms,
the coated material has a hole on a surface on the outermost layer side thereof,
the hole extends in a direction perpendicular to a thickness direction of the outermost layer,
the hole separates the outermost layer in the direction perpendicular to the thickness direction when the outermost layer is seen in a cross-sectional view taken along the thickness direction,
the hole is exposed to an outside of the surface-treated metal,
an area of the outermost layer is 50% to 98% of an area of the surface of the metal when the coated material is seen in a plan view,
a surface area, which is exposed to the outside of the surface-treated metal, of the outermost layer is 101% to 5000% of the area of the surface of the metal,
a ratio of a micro-Vickers hardness of the second layer to a micro-Vickers hardness of the outermost layer is 0.20 to 0.95, and
a water contact angle of the second layer is in a range obtained by adding 10° to 80° to a water contact angle of the outermost layer.

2. A surface-treated metal comprising:
a metal; and
a coated material that is formed on a surface of the metal,
wherein an outermost layer of the coated material is a photocatalytic film that contains particles showing a photocatalytic activity and an organic-inorganic composite resin,
the coated material has a second layer in contact with the outermost layer between the outermost layer and the metal,
a volume ratio of the particles showing the photocatalytic activity to the photocatalytic film is in a range from 0.5 vol % to 50 vol %,
the organic-inorganic composite resin contains a siloxane bond and at least one group selected from the group consisting of an aryl group, a carboxyl group, an amino group, a hydroxyl group, and an alkyl group having 1 to 12 carbon atoms, the coated material has a hole on a surface on the outermost layer side thereof, the hole extends in a direction perpendicular to a thickness direction of the outermost layer, the hole separates the outermost layer in the direction perpendicular to the thickness direction when the outermost layer is seen in a cross-sectional view taken along the thickness direction, the hole is exposed to an outside of the surface-treated metal, an area of the outermost layer is 50% to 98% of an area of the surface of the metal when the coated material is seen in a plan view, a surface area, which is exposed to the outside of the surface-treated metal, of the outermost layer is 101% to 5000% of the area of the surface of the metal, and a water contact angle of the second layer is in a range obtained by adding 10° to 80° to a water contact angle of the outermost layer.

3. A surface-treated metal comprising:

a metal; and a coated material that is formed on a surface of the metal, wherein an outermost layer of the coated material is a photocatalytic film that contains particles showing a photocatalytic activity and an organic-inorganic composite resin, a volume ratio of the particles showing the photocatalytic activity to the photocatalytic film is in a range from 0.5 vol % to 50 vol %, the organic-inorganic composite resin contains a siloxane bond and at least one group selected from the group consisting of an aryl group, a carboxyl group, an amino group, a hydroxyl group, and an alkyl group having 1 to 12 carbon atoms, the coated material has a hole on a surface on the outermost layer side thereof, the hole extends in a direction perpendicular to a thickness direction of the outermost layer, the hole separates the outermost layer in the direction perpendicular to the thickness direction when the outermost layer is seen in a cross-sectional view taken along the thickness direction, the hole is exposed to an outside of the surface-treated metal, an area of the outermost layer is 50% to 98% of an area of the surface of the metal when the coated material is seen in a plan view, a surface area, which is exposed to the outside of the surface-treated metal, of the outermost layer is 101% to 5000% of the area of the surface of the metal, a ratio of the particles showing the photocatalytic activity to the photocatalytic film is in a range from 0.5 mass % to 50 mass %, a particle size distribution based on a number of the particles showing the photocatalytic activity has a plurality of maximum values and minimum values which are present between adjacent maximum values in the plurality of maximum values, and two or more maximum values in the plurality of maximum values have a number frequency which is 1.5 times or greater of a number frequencies of minimum values adjacent to the maximum values thereof, and a water contact angle of the second layer is in a range obtained by adding 10° to 80° to a water contact angle of the outermost layer.

4. The surface-treated metal according to claim 3, wherein the particle size distribution has at least one of the two or more maximum values of a particle size range of 100 nm or less and has at least one of the two or more maximum values of a particle size range of 500 nm or greater.

5. The surface-treated metal according to any one of claim 1, 2, 3, or 4, wherein, when dimensions of the hole in a direction perpendicular to both a direction in which the hole extends and the thickness direction are represented by widths W and dimensions of the hole in the direction in which the hole extends are represented by lengths L, a total of the lengths L of the hole of portions in which the widths W are in a range from 1% to 1000% of a thickness of the outermost layer is 90% to 100% of a total of the lengths L of the hole.

6. The surface-treated metal according to any one of claim 1, 2, 3, or 4, wherein, when the coated material is seen in the plan view, a plurality of the holes is present, the holes form a network shape, and sizes of portions of the outermost layer which are surrounded by the holes are different from each other.

7. The surface-treated metal according to any one of claim 1, 2, 3, or 4, wherein, when the outermost layer is seen in the cross-sectional view taken along the thickness direction, among two surfaces facing each other in the thickness direction of the outermost layer, a surface opposite the metal has a plurality of flat areas, and a total length of the plurality of flat areas is 70% to 99% of a total length of the surface.

8. The surface-treated metal according to any one of claim 1, 2, 3, or 4, wherein the particles showing the photocatalytic activity contain a titanium oxide having an anatase-type structure.

9. The surface-treated metal according to any one of claim 1, 2, 3, or 4, wherein the metal is any one selected from the group consisting of a steel sheet, a stainless steel sheet, a titanium sheet, a titanium alloy sheet, an aluminum sheet, an aluminum alloy sheet, and a plated metal sheet having a plated layer.

* * * * *